(12) United States Patent
Aung et al.

(10) Patent No.: US 11,952,122 B2
(45) Date of Patent: *Apr. 9, 2024

(54) LATERAL SLEEP SYSTEMS FOR AIRCRAFT

(71) Applicant: The Boeing Company, Chicago, IL (US)

(72) Inventors: Nyein Chan Aung, Heidelberg (AU); Mark Armstrong, Yowie Bay (AU); Arthur de Bono, Williamstown (AU); Robbie Napper, Coburg (AU)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,131

(22) Filed: Aug. 12, 2022

(65) Prior Publication Data

US 2022/0380053 A1 Dec. 1, 2022

Related U.S. Application Data

(62) Division of application No. 17/131,111, filed on Dec. 22, 2020, now Pat. No. 11,447,253, which is a (Continued)

(51) Int. Cl.
*B64D 11/06* (2006.01)

(52) U.S. Cl.
CPC ...... *B64D 11/0606* (2014.12); *B64D 11/0601* (2014.12); *B64D 11/0642* (2014.12)

(58) Field of Classification Search
CPC ............ B64D 11/0606; B64D 11/0601; B64D 11/0642

See application file for complete search history.

(56) References Cited

U.S. PATENT DOCUMENTS

| D102,971 S | 1/1937 | Hale |
| 3,851,919 A | 12/1974 | Nagy |

(Continued)

FOREIGN PATENT DOCUMENTS

| CN | 1942364 A | 4/2007 |
| DE | 19541567 | 1/1997 |

(Continued)

OTHER PUBLICATIONS

Tangerine, "Aircraft cabin harmony Cathay Pacific," retrieved from [http://tangerine.net/our-work/cathay-pacific-a350-aircraft-cabin-harmony/] on Oct. 11, 2018, 8 pages.

(Continued)

*Primary Examiner* — Jessica B Wong
(74) *Attorney, Agent, or Firm* — Hanley, Flight & Zimmerman, LLC

(57) ABSTRACT

Lateral sleep systems for aircraft are disclosed. A divider is located between a first seat and a second seat of the aircraft. The divider includes a first panel oriented toward the first seat and a second panel oriented toward the second seat. The first panel defines a first support ledge. The second panel defines a second support ledge. A first lateral sleep apparatus positioned on a first side of the divider adjacent the first seat includes a first headrest and a first cradle. The first cradle supports the first headrest and includes a first panel mounting interface coupling the first headrest to the first support ledge. A second lateral sleep apparatus positioned on a second side of the divider adjacent the second seat includes a second headrest and a second cradle. The second cradle supports the second headrest and includes a second panel mounting interface coupling the second headrest to the second support ledge.

20 Claims, 21 Drawing Sheets

Related U.S. Application Data division of application No. 15/985,387, filed on May 21, 2018, now Pat. No. 10,899,458.

(56) References Cited

U.S. PATENT DOCUMENTS

| | | | |
|---|---|---|---|
| D246,304 S | 11/1977 | Horn | |
| 5,024,398 A * | 6/1991 | Riedinger | B64D 11/0605 |
| | | | 244/118.5 |
| D349,608 S | 8/1994 | Savoie | |
| 5,384,998 A | 1/1995 | Tanaka et al. | |
| D382,735 S | 8/1997 | Zapf | |
| D439,425 S | 3/2001 | Park et al. | |
| D443,990 S * | 6/2001 | Beroth | B64D 11/0602 |
| | | | D6/356 |
| D510,816 S | 10/2005 | Lee | |
| 7,059,657 B2 | 6/2006 | Bodin et al. | |
| D558,993 S | 1/2008 | Saint-Jalmes et al. | |
| D591,520 S | 5/2009 | Orson et al. | |
| D609,500 S | 2/2010 | Fieldhouse et al. | |
| D611,399 S | 3/2010 | Bock | |
| D615,919 S | 5/2010 | Bock | |
| D621,331 S | 8/2010 | Bock | |
| D623,577 S | 9/2010 | Orson et al. | |
| D623,578 S | 9/2010 | Orson et al. | |
| D656,750 S | 4/2012 | Porter et al. | |
| D686,423 S | 7/2013 | Salzberger et al. | |
| D695,033 S | 12/2013 | Salzberger et al. | |
| D702,623 S | 4/2014 | Salzberger et al. | |
| D713,160 S | 9/2014 | Roberts et al. | |
| D715,066 S | 10/2014 | Nicholas et al. | |
| D718,945 S | 12/2014 | Nicholas et al. | |
| D727,042 S | 4/2015 | Wagner et al. | |
| D740,039 S | 10/2015 | Bouroullec et al. | |
| 9,248,722 B2 | 2/2016 | Gillay et al. | |
| D758,270 S | 6/2016 | Zadnik | |
| D765,571 S | 9/2016 | Faghihzadeh | |
| D777,636 S | 1/2017 | Lindsey | |
| 9,545,999 B2 | 1/2017 | Henshaw | |
| 9,622,570 B1 | 4/2017 | Holdredge et al. | |
| D790,239 S | 6/2017 | Goode et al. | |
| D791,031 S | 7/2017 | Lindsey | |
| D792,932 S | 7/2017 | Taylor et al. | |
| D793,749 S | 8/2017 | Kitajima | |
| D793,750 S | 8/2017 | Kitajima | |
| D793,932 S | 8/2017 | Yoon et al. | |
| D794,344 S | 8/2017 | MacAllen et al. | |
| 9,758,027 B1 | 9/2017 | Sia, Jr. et al. | |
| D798,622 S | 10/2017 | Grader et al. | |
| D806,416 S | 1/2018 | Katakura et al. | |
| 9,856,025 B2 | 1/2018 | Jasny et al. | |
| D811,970 S | 3/2018 | Lokers | |
| D814,374 S | 4/2018 | Patterson et al. | |
| 9,938,015 B2 | 4/2018 | Savian | |
| D818,921 S | 5/2018 | Pelletier et al. | |
| D830,712 S | 10/2018 | Goode et al. | |
| 10,246,192 B1 | 4/2019 | Prasad | |
| D849,624 S | 5/2019 | Von Holzhausen et al. | |
| 10,279,912 B2 | 5/2019 | Robinson et al. | |
| D850,131 S | 6/2019 | Goode et al. | |
| D851,004 S | 6/2019 | Jackson et al. | |
| 10,308,100 B2 | 6/2019 | Bendiks et al. | |
| D856,692 S | 8/2019 | Veneruso | |
| 10,562,633 B2 | 2/2020 | Kuyper et al. | |
| D880,175 S | 4/2020 | Gyllang | |
| D895,312 S | 9/2020 | Aung et al. | |
| 10,899,458 B2 | 1/2021 | Aung et al. | |
| D911,899 S | 3/2021 | Aung et al. | |
| 11,046,436 B2 * | 6/2021 | Carlioz | B64D 11/0643 |
| 11,447,253 B2 * | 9/2022 | Aung | B60N 2/885 |
| 2002/0070314 A1 | 6/2002 | Schmidt-Schaeffer | |
| 2004/0232283 A1 | 11/2004 | Ferry et al. | |
| 2005/0001097 A1 | 1/2005 | Saint-Jalmes | |
| 2005/0023413 A1 | 2/2005 | Saint-Jalmes | |
| 2005/0087650 A1 | 4/2005 | Quan et al. | |
| 2006/0086864 A1 | 4/2006 | Beroth | |
| 2006/0097553 A1 | 5/2006 | Spurlock et al. | |
| 2006/0170261 A1 | 8/2006 | Baatz et al. | |
| 2006/0219843 A1 | 10/2006 | Martin | |
| 2007/0164157 A1 | 7/2007 | Park | |
| 2007/0170310 A1 * | 7/2007 | Bock | B64D 11/0606 |
| | | | 244/118.5 |
| 2007/0210209 A1 | 9/2007 | Saint-Jalmes et al. | |
| 2007/0246981 A1 | 10/2007 | Plant | |
| 2008/0088160 A1 | 4/2008 | Johnson | |
| 2009/0050740 A1 | 2/2009 | Saint-Jalmes et al. | |
| 2009/0146004 A1 | 6/2009 | Plant | |
| 2009/0146006 A1 | 6/2009 | Park et al. | |
| 2009/0243352 A1 * | 10/2009 | Cailleteau | B64D 11/0604 |
| | | | 297/411.3 |
| 2010/0065683 A1 | 3/2010 | Darbyshire | |
| 2010/0163674 A1 | 7/2010 | Bock | |
| 2010/0308164 A1 | 12/2010 | Mckeever | |
| 2011/0012386 A1 | 1/2011 | Bmcick et al. | |
| 2012/0146372 A1 | 6/2012 | Ferry | |
| 2012/0223186 A1 | 9/2012 | Henshaw | |
| 2012/0223557 A1 | 9/2012 | Henshaw | |
| 2012/0248246 A1 | 10/2012 | Savian | |
| 2012/0248426 A1 | 10/2012 | Kato | |
| 2012/0292973 A1 | 11/2012 | Westerink et al. | |
| 2012/0305705 A1 | 12/2012 | Vergnaud et al. | |
| 2012/0318918 A1 | 12/2012 | Johnson et al. | |
| 2013/0248655 A1 * | 9/2013 | Kroll | B64D 11/0604 |
| | | | 244/118.6 |
| 2014/0015233 A1 | 1/2014 | Fukawatase | |
| 2014/0117731 A1 | 5/2014 | Asli | |
| 2014/0159356 A1 | 6/2014 | Kastelic et al. | |
| 2014/0300152 A1 | 10/2014 | Park et al. | |
| 2014/0361585 A1 | 12/2014 | Henshaw | |
| 2015/0001341 A1 | 1/2015 | Ersan et al. | |
| 2015/0151652 A1 | 6/2015 | Jerome et al. | |
| 2016/0052633 A1 | 2/2016 | Lawson et al. | |
| 2016/0272323 A1 | 9/2016 | Carlioz | |
| 2017/0015420 A1 | 1/2017 | Henshaw et al. | |
| 2017/0197529 A1 | 7/2017 | Hontz et al. | |
| 2017/0240283 A1 * | 8/2017 | Dowty | B64D 11/0604 |
| 2017/0259921 A1 * | 9/2017 | Valdes De La Garza | B64D 11/0638 |
| 2018/0009346 A1 * | 1/2018 | Ugran | B60N 2/976 |
| 2018/0215469 A1 | 8/2018 | Uriu et al. | |
| 2019/0061955 A1 | 2/2019 | Wilson et al. | |
| 2019/0077512 A1 | 3/2019 | Bentley et al. | |
| 2019/0352011 A1 | 11/2019 | Aung et al. | |
| 2020/0108934 A1 * | 4/2020 | Williamson | B64D 11/0643 |
| 2021/0107661 A1 | 4/2021 | Aung et al. | |
| 2021/0300566 A1 | 9/2021 | Pence et al. | |

FOREIGN PATENT DOCUMENTS

| | | |
|---|---|---|
| EP | 3572323 B1 | 4/2019 |
| EP | 3594049 | 1/2020 |
| FR | 2930208 | 10/2009 |
| FR | 2935113 | 2/2010 |
| GB | 2433433 | 6/2007 |
| GB | 2454751 A | 5/2009 |
| KR | 301047850.0000 | 2/2020 |
| WO | 03068556 | 8/2003 |
| WO | 2018169575 | 9/2018 |

OTHER PUBLICATIONS

Bradley, "Flying With a Baby, British Airways B777 Business Class (Club Class) Review," Mar. 25, 2018, retrieved from [https://www.flyingwithababy.com/british-airways-b777-club-class-review/] on Oct. 11, 2018, 17 pages.

Seating configuration, image retrieved from [https://encrypted-tbn0.gstatic.com/images?q=tbn:ANd9GcRdZplfGO_jv-QH9z9MqZ4u6NxOQud8XSA73IWM6TZRC6a38tuOEQ] on Oct. 11, 2018, 1 page.

Airline Reporter, "The Plane that Pampers People," image retrieved from http://www.airlinereporter.com/wp-content/uploads/2013/01/L1011.jpg, on Oct. 11, 2018, 1 page.

(56) References Cited

OTHER PUBLICATIONS

European Patent Office, "Extended European Search Report," issued in connection with European Patent Application No. 19169257.3 dated Dec. 11, 2019, 14 pages.
European Patent Office, "Partial European Search Report," issued in connection with European Patent Application No. 19169257.3 dated Sep. 11, 2019, 15 pages.
Brazilian Patent Office, "Office Action," issued in connection with Brazilian Patent Application No. 30 2019 001867-5 dated Oct. 22, 2019, 2 pages.
United States Patent and Trademark Office, "Ex parte Quayle Action," issued in connection with U.S. Appl. No. 29/648,441 on Feb. 14, 2020, 10 pages.
United States Patent and Trademark Office, "Notice of Allowance and Fee(s) Due," issued in connection with U.S. Appl. No. 29/648,441 dated Apr. 30, 2020, 7 pages.
United States Patent and Trademark Office, "Notice of Allowance and Fee(s) Due," issued in connection with U.S. Appl. No. 15/985,387 dated Sep. 23, 2020, 8 pages.
Canadian Intellectual Property Office, "Examination Report," issued in connection with Canadian Patent Application No. 187379 dated Jul. 20, 2020, 2 pages.
United States Patent and Trademark Office, "Non-Final Rejection," issued in connection with U.S. Appl. No. 29/648,442 dated May 18, 2020, 15 pages.
United States Patent and Trademark Office, "Final Rejection," issued in connection with U.S. Appl. No. 29/648,442 dated Sep. 8, 2020, 10 pages.
United States Patent and Trademark Office, "Requirement for Restriction/Election," issued in connection with U.S. Appl. No. 15/985,387 dated Jul. 27, 2020, 5 pages.
Lux-Traveller.com, "New Swiss Boeing 777 Business and First class cabins," dated Jul. 9, 2015, retrieved from [http://lux-traveller.com/2015/swiss-boeing777-first-business-class.htm] on May 1, 2020, 8 pages.
The Luxury Travel Expert, "Top 10 best airlines for longhaul Business Class," dated Apr. 6, 2020, retrieved from [https://theluxurytravelexpert.com/2020/04/06/top-10-business-class/] on May 1, 2020, 14 pages.
Stein, "Not All Dreamliner Configurations Are Created Equal," dated Jan. 10, 2018, retrieved from [https://travelwithgrant.boardingarea.com/2018/01/10/not-all-dreamliner-configurations-are-created-equal-shelli/], on May 1, 2010, 7 pages.
United States Patent and Trademark Office, "Notice of Allowance and Fee(s) Due," issued in connection with U.S. Appl. No. 29/648,442 dated Oct. 26, 2020, 7 pages.
Canadian Intellectual Property Office, "Office Action," issued in connection with Canadian Patent Application No. 3,039,467, dated Jun. 10, 2022. 3 pages.
United States Patent and Trademark Office, "Requirement for Restriction/Election," issued in connection with U.S. Appl. No. 17/131,111 dated Nov. 8, 2021, 6 pages.
United States Patent and Trademark Office, "Non-Final Office Action," issued in connection with U.S. Appl. No. 17/131,111 dated Mar. 7, 2022, 8 pages.
United States Patent and Trademark Office, "Final Office Action," issued in connection with U.S. Appl. No. 17/131,111 dated Jun. 13, 2022, 6 pages.
United States Patent and Trademark Office, "Notice of Allowance and Fee(s) Due," issued in connection with U.S. Appl. No. 17/131,111 dated Jul. 18, 2022, 6 pages.
Instituto Nacional Da Propriedade Industrial, "Relatório De Busca," (Written Opinion), issued in connection with Brazilian Patent Application No. 102019010136, dated May 17, 2019, 6 pages. English Machine Translation Provided.
China National Intellectual Property Administration, "Office Action", issued in connection with CN Patent Application No. 2019103932388 dated Aug. 19, 2023, 20 pages.

* cited by examiner

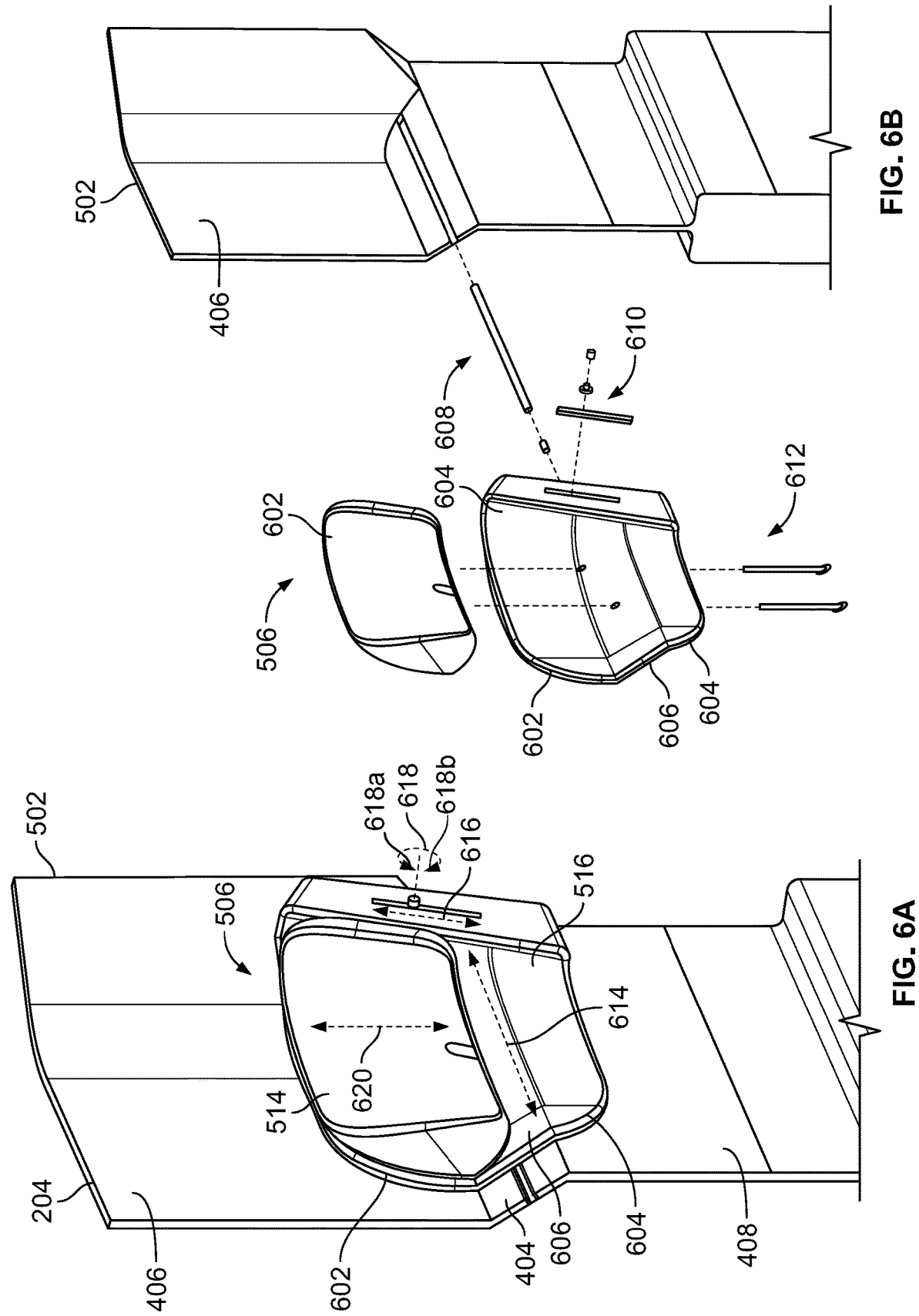

LATERAL SLEEP SYSTEMS FOR AIRCRAFT

CROSS-REFERENCE TO RELATED APPLICATIONS

This patent arises from a divisional of U.S. patent application Ser. No. 17/131,111, filed on Dec. 22, 2020, entitled "Aircraft Sleep Systems Including Laterally Positioned Moveable Headrests," which is a divisional of U.S. patent application Ser. No. 15/985,387, filed on May 21, 2018, entitled "Sleep Systems For Aircraft." The entireties of U.S. patent application Ser. No. 17/131,111 and U.S. patent application Ser. No. 15/985,387 are hereby incorporated by reference herein.

FIELD OF THE DISCLOSURE

This disclosure relates generally to aircraft and, more particularly, to sleep systems for aircraft.

BACKGROUND

A fuselage of an aircraft defines a cabin having numerous passenger seats for transporting passengers. The passenger seats are typically arranged in rows of seats. Most aircraft seats can recline and include headrests to help passengers rest or sleep during flight. However, a passenger's head can experience (e.g., gravity induced) side-to-side or lateral movement due to inadequate lateral support even when a headrest-equipped seat is in a reclined position.

BRIEF DESCRIPTION OF THE DRAWINGS

FIG. 6A is a perspective, assembled view of an example first panel and an example lateral sleep apparatus of the example divider seat assembly of FIGS. 5A and 5B.

FIG. 6B is an exploded view of the example first panel and the example lateral sleep apparatus of FIG. 6A.

Figure 1:
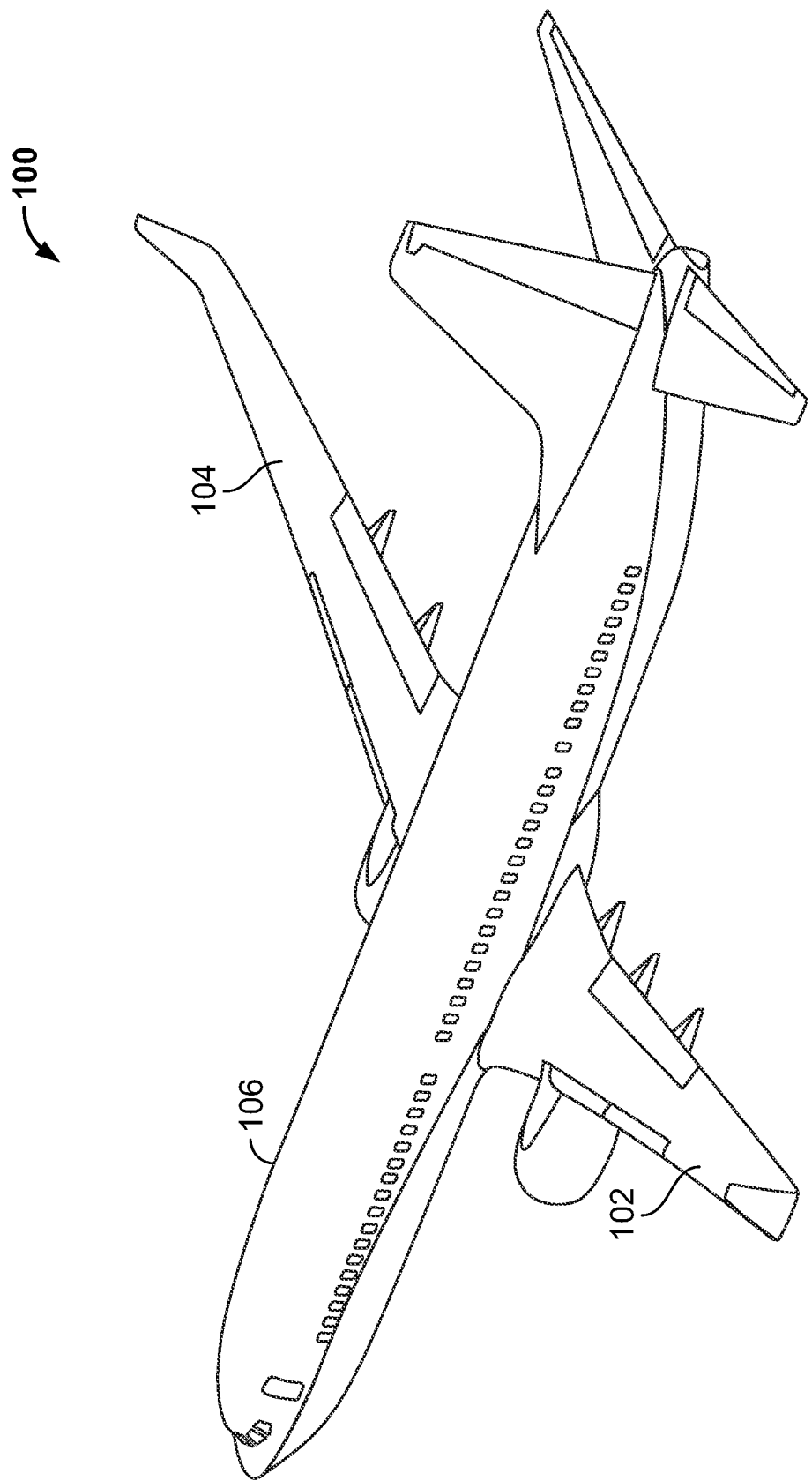
FIG. 1 is an example aircraft implemented with an example sleep system in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. In other words, the example disclosed herein are not mutually exclusive to each other. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Aircraft passenger cabins typically include reclinable, headrest-equipped seats. For example, a conventional seat of an aircraft includes a headrest that is integrally formed with a seat as a unitary structure (e.g., positioned above a backrest of the seat). Some known seats include headrests that can move (e.g., slide) to adjust a position of the headrests. For example, some known headrests can slide up and down or fold at lateral sides of the seats. The seat can recline for added comfort. During flight, a window seat is often desired by passengers, as a wall of the cabin adjacent the window seat can be used by passengers for sleep support. In some examples, aircraft employ seats that offer increased pitch or lie-flat configurations to improve sleep comfort during flight. However, such seating is often available in higher flying classes (e.g., upper class, business class, etc.). Some aircraft employ sleep berth configurations. However, sleep berth configurations have larger dimensional envelopes compared to conventional seats and require additional cabin space, thereby reducing cargo carrying capacity of an aircraft and/or passenger accommodation and increasing travel costs. In most instances, aircraft seating employing increased pitch and/or sleep berth configurations may not be economically feasible.

Example repose sleep systems disclosed herein provide lateral sleep apparatus for aircraft or other passenger vehicles (e.g., trains, etc.). As used herein, repose sleep systems include one or more cushions or other sleep apparatus to aid or improve passenger sleep experience by providing additional support (e.g., lateral support), more positional options for passengers (e.g., side-leaning options), natural side-alignment positions for resting on a cushion (e.g., a lateral cushion), etc. Specifically, example repose sleep systems disclosed herein employ lateral sleep apparatus to improve passenger (e.g., in-flight) sleep experience and can be implemented with aircraft (e.g., or other vehicles) without reducing aircraft seating and/or aisle width. For example, the lateral sleep apparatus and/or sleep systems disclosed herein do not cause loss of seat pitch (e.g., distance between a seat and another seat directly in front of the seat), loss of aisle width, and/or do not cause interference with tray table.

Example repose sleep systems disclosed herein employ lateral sleep apparatus that interface with existing seating and/or fuselage walls of a cabin of a vehicle (e.g., a locomotive, an aircraft, etc.). In some examples, example lateral sleep apparatus disclosed herein can be supported by a wall located inside a cabin to increase a headrest area provided by conventional seating of a cabin (e.g., an aircraft). In some examples, example lateral sleep apparatus disclosed herein can directly attach to a wall and/or a seat of a cabin. In some such examples, the lateral sleep apparatus employs a track system that can be coupled to a wall of the cabin (e.g., a fuselage wall, a partition wall, etc.) In some examples, example lateral sleep apparatus disclosed herein do not directly attach to seating and are supported by a wall of the cabin. In some such examples, the lateral sleep apparatus disclosed herein do not employ a track system that couples to a wall of the cabin (e.g., a fuselage wall, a partition wall, etc.) Thus, in some examples, example lateral sleep apparatus can retrofit existing vehicle cabins.

Example sleep systems disclosed herein provide a modular seating system that can be configured or adapted to fit various seating schemes (e.g., seating patterns or arrangements) of different aircraft operators. For example, sleep systems disclosed herein employ a modular divider having panels or support structures. Additionally, the dividers disclosed herein can support lateral sleep apparatus disclosed herein. Example panels of an example modular divider disclosed herein are removably coupled to or positioned adjacent (in an abutting configuration) to increase or reduce a length (e.g., an overall length in the longitudinal direction) of the divider to accommodate different seating configurations. In some examples, example panels disclosed herein can have pockets or surfaces arranged in a staggered profile relative to a longitudinal axis (e.g., a centerline) of the cabin or the divider. For example, example pockets of the divider can be arranged in a zig-zag pattern or layout. Each of the panels or support structures of example dividers disclosed herein can include an integrated armrest adjacent the seat.

Example lateral sleep apparatus disclosed herein improve sleep experience for passengers (e.g., economy class, business class, etc.) seated adjacent windows of an aircraft and/or a partition or dividing wall of a cabin of an aircraft. For example, lateral sleep apparatus disclosed herein improve sleep experience by reducing (e.g., gravity induced) side-to-side or lateral movement of a body (e.g., a head) of a passenger. For example, a passenger can lean on one side with the support of the lateral sleep apparatus disclosed herein to eliminate or reduce, for example, gravity induced side-to-side movement. To this end, each of the passenger seats immediately adjacent a window of a cabin and/or each of the passenger seats immediately adjacent the divider of the cabin can include an example lateral sleep apparatus disclosed herein. In some examples, example dividers disclosed herein can increase (e.g., double) a number of passenger seats of a cabin that can include or support example lateral sleep apparatus disclosed herein. Example lateral sleep apparatus disclosed herein can interface with a wall of a cabin defined by a fuselage (e.g., a fuselage wall) and/or a wall of the cabin defined by a divider (e.g., a divider wall).

Panels or support structures of the example dividers disclosed herein define an interface to support lateral sleep apparatus disclosed herein. In some examples, to support example lateral sleep apparatus, each panel or support structure of the example dividers disclosed herein include a pocket relief positioned and/or initiating at or adjacent a first headrest of a seat. In some examples, the lateral sleep apparatus projects outwardly from a lateral side of the passenger seat. Example lateral sleep apparatus include a second headrest to be positioned adjacent the first headrest of the seat via the pocket relief of the panel such that the first and second headrests provide a continuous headrest extending from the seat onto the divider (e.g., an L-shaped continuous headrest). In some examples, a divider disclosed herein can have a substantially straight profile (e.g., a flat wall) without defining a pocket or recess. In some such examples, a flat wall defined by the divider provides a support structure for the example lateral sleep apparatus disclosed herein.

Additionally, lateral sleep apparatus disclosed herein can move with the passenger seat when the passenger seat moves between an upright position and a reclined position. For example, lateral sleep apparatus disclosed herein can move along a linear path (e.g., a horizontal path) when a passenger seat moves between the upright position and the reclined position. In some examples, the lateral sleep apparatus disclosed herein maintains substantially the same elevation when the seat moves between the upright position and the reclined position. To enable the lateral sleep apparatus to move with the seat, example lateral sleep apparatus disclosed herein can couple or attach to a lateral side of a passenger seat. Additionally or alternatively, example lateral sleep apparatus disclosed herein adjust between a lowered position and a raised position. For example, the example lateral sleep apparatus disclosed herein can adjust in a vertical direction. Thus, example lateral sleep apparatus disclosed herein can move relative to the wall and/or the divider in a first direction (e.g., a horizontal direction) and/or a second direction (e.g., a vertical direction) different than the first direction.

FIG. 1 is an aircraft 100 implemented with an example sleep system in accordance with teachings of this disclosure. The aircraft 100 is an example aircraft and, thus, the example apparatus disclosed herein can be implemented with other aircraft, spacecraft, or vehicles without departing from the scope of this disclosure. For example, instead of an aircraft, examples disclosed herein can be used with buses, trains, watercraft, spacecraft, and the like.

The aircraft 100 of the illustrated example is a commercial aircraft having a first wing 102 and a second wing 104 extending from a fuselage 106. The fuselage 106 includes a cabin for transporting passengers. The cabin can include a cockpit, one or more work sections (for example, lavatories, galleys, personnel carry-on baggage areas, and the like), and/or one or more passenger sections (for example, first class, business class, cabins, and coach sections, expanded economy section, and/or the like).

Figure 2A:
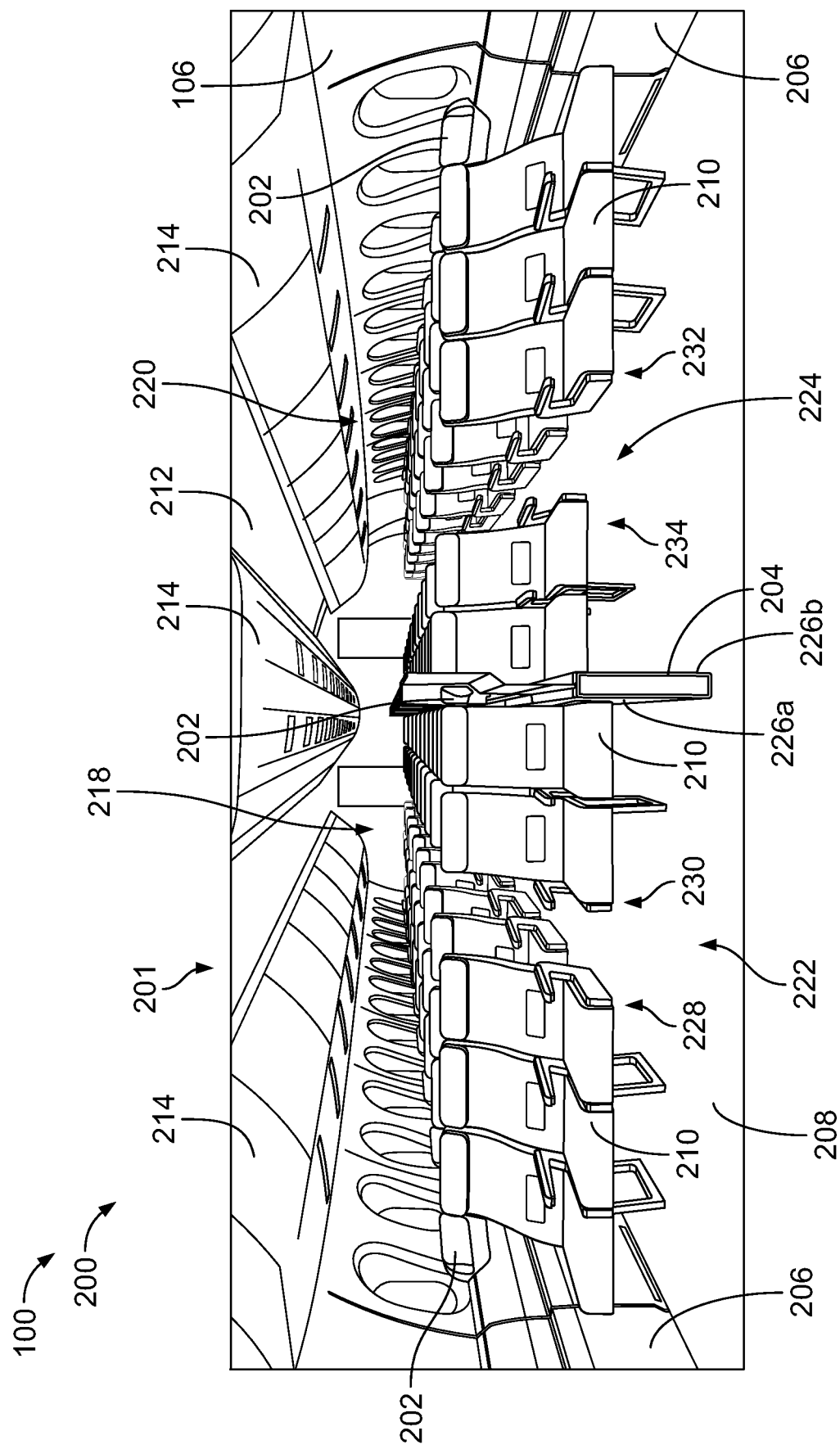
FIG. 2A is a partial, front view of an example cabin of the example aircraft of FIG. 1.
Figure 2B:
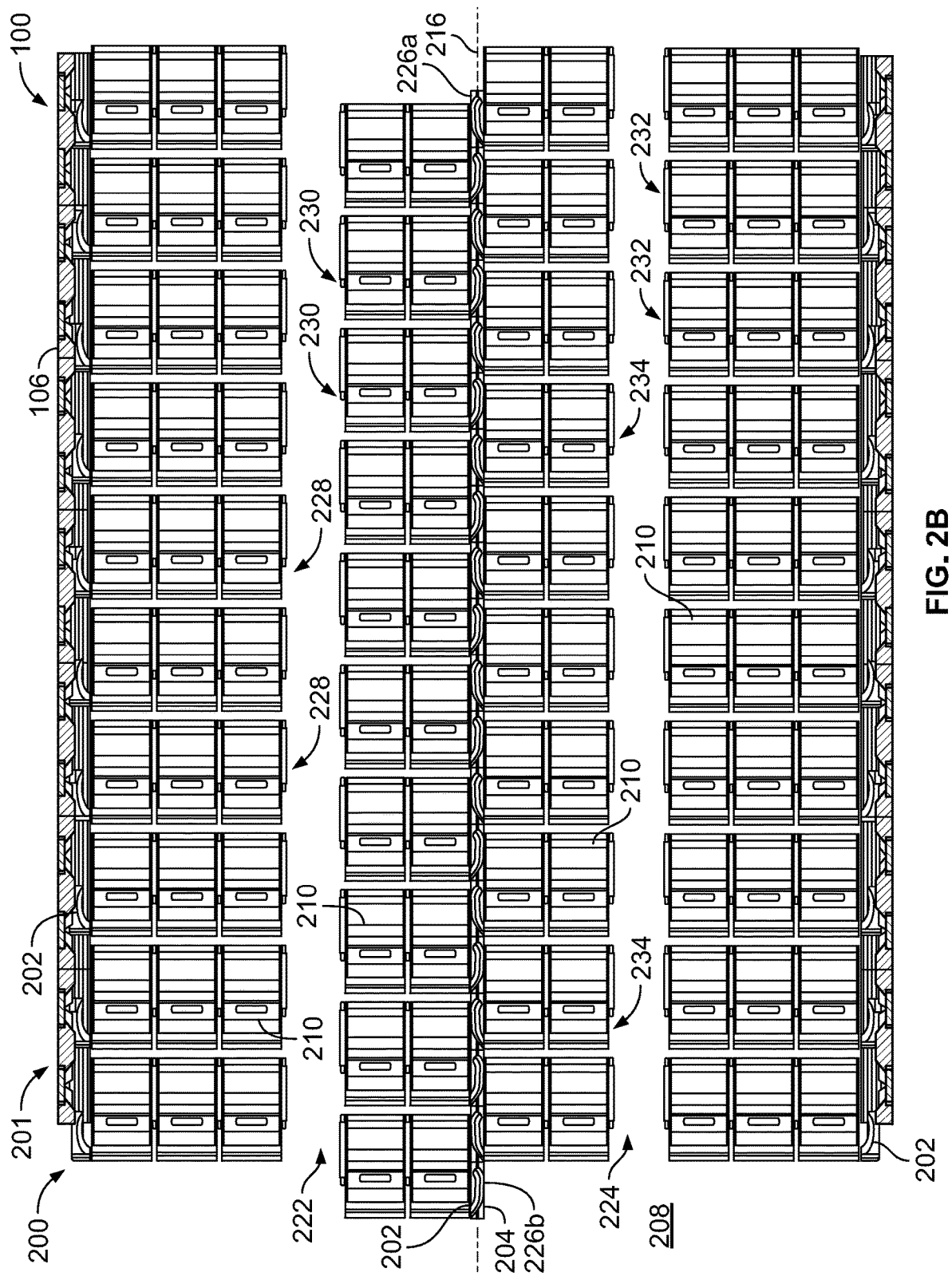
FIG. 2B is a top view of the example cabin of FIG. 2A.

FIG. 2A is a partial, front view of a cabin 200 of the aircraft 100 of FIG. 1. FIG. 2B is a top view of the cabin 200 of FIG. 2A. The cabin 200 is within the fuselage 106 of the aircraft 100. The cabin 200 of the illustrated example includes a sleep system 201 that includes lateral sleep apparatus 202 and a divider 204 in accordance with the teachings of this disclosure. The sleep system 201 (e.g., the lateral sleep apparatus 202 and/or the divider 204) can be an aircraft sleep system and/or a sleep system positioned in or for an aircraft (e.g., the aircraft 100 of FIG. 1). The cabin 200 is defined by a fuselage wall 206 and a floor 208 of the fuselage 106. The floor 208 supports seats 210 and a ceiling 212 supports overhead bins 214. The divider 204 (e.g., a center wall) extends in a direction along a longitudinal axis 216 (FIG. 2B) of the aircraft 100 (e.g., between a nose of the aircraft 100 and a tail of the aircraft 100) and separates (e.g., divides) the cabin 200 into a first portion 218 (e.g., a first half) and a second portion 220 (e.g., a second half). In this example, the divider 204 extends from the floor 208 toward the ceiling 212 to define a partial wall (e.g., a quarter-wall, a half-wall, a three-quarter wall, etc.). For example, the divider 204 does not engage the ceiling 212 (e.g., is spaced a distance from, or forms a gap with, the ceiling 212).

The cabin 200 includes a first aisle 222 and a second aisle 224 (e.g., a twin-aisle cabin) that extend between a fore section and aft section of the cabin 200 (e.g., along the longitudinal axis 216 of the aircraft 100). The first aisle 222 separates the seats 210 located in the first portion 218 into a plurality of first outer rows 228 and a plurality of first inner rows 230 and the second aisle 224 separates the seats 210 located in the second portion 220 into a plurality of second outer rows 232 and a plurality of second inner rows 234. The divider 204 is positioned between the first inner rows 230 and the second inner rows 234 such that the seats 210 of the first inner rows 230 are positioned on a first side 226a of the divider 204 and the seats 210 of the second inner rows 234 are positioned on a second side 226b of the divider 204 opposite the first side 226a. To accommodate the lateral sleep apparatus 202 without reducing a number of seats 210 of the cabin 200 (e.g., compared to a cabin implemented without the lateral sleep apparatus), respective ones of the first inner rows 230 of the seats 210 are offset (e.g., are staggered in alternating fashion or a zig-zag pattern) relative to respective ones of the second inner rows 234 of the seats 210. Thus, the lateral sleep apparatus 202 disclosed herein do not reduce or affect a number of seats 210 of the cabin 200. Additionally, respective ones of the first outer rows 228 of the seats 210 are offset relative to respective ones of the first inner rows 230 of the seats 210. In some examples, the cabin 200 can have more or fewer aisles than shown. For example, the cabin 200 can include a single aisle that extends through a center of the cabin 200 between the fore and aft sections. In some such examples, the divider 204 and/or the first inner rows 230 and the second inner rows 234 of the seats 210 may not be included.

Figure 3A:
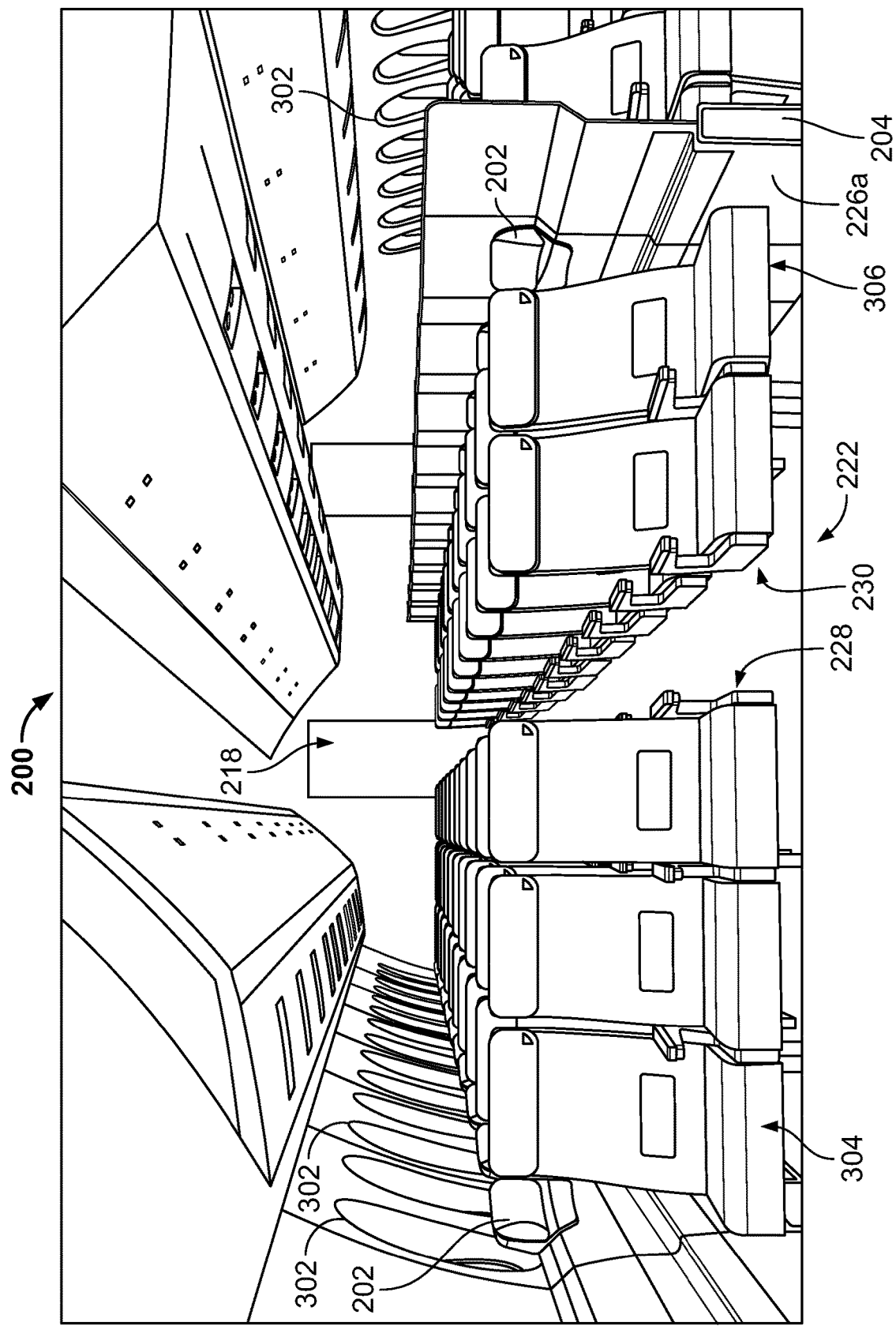
FIG. 3A is a perspective view of an example first portion of the example cabin of FIGS. 2A and 2B.
Figure 3B:
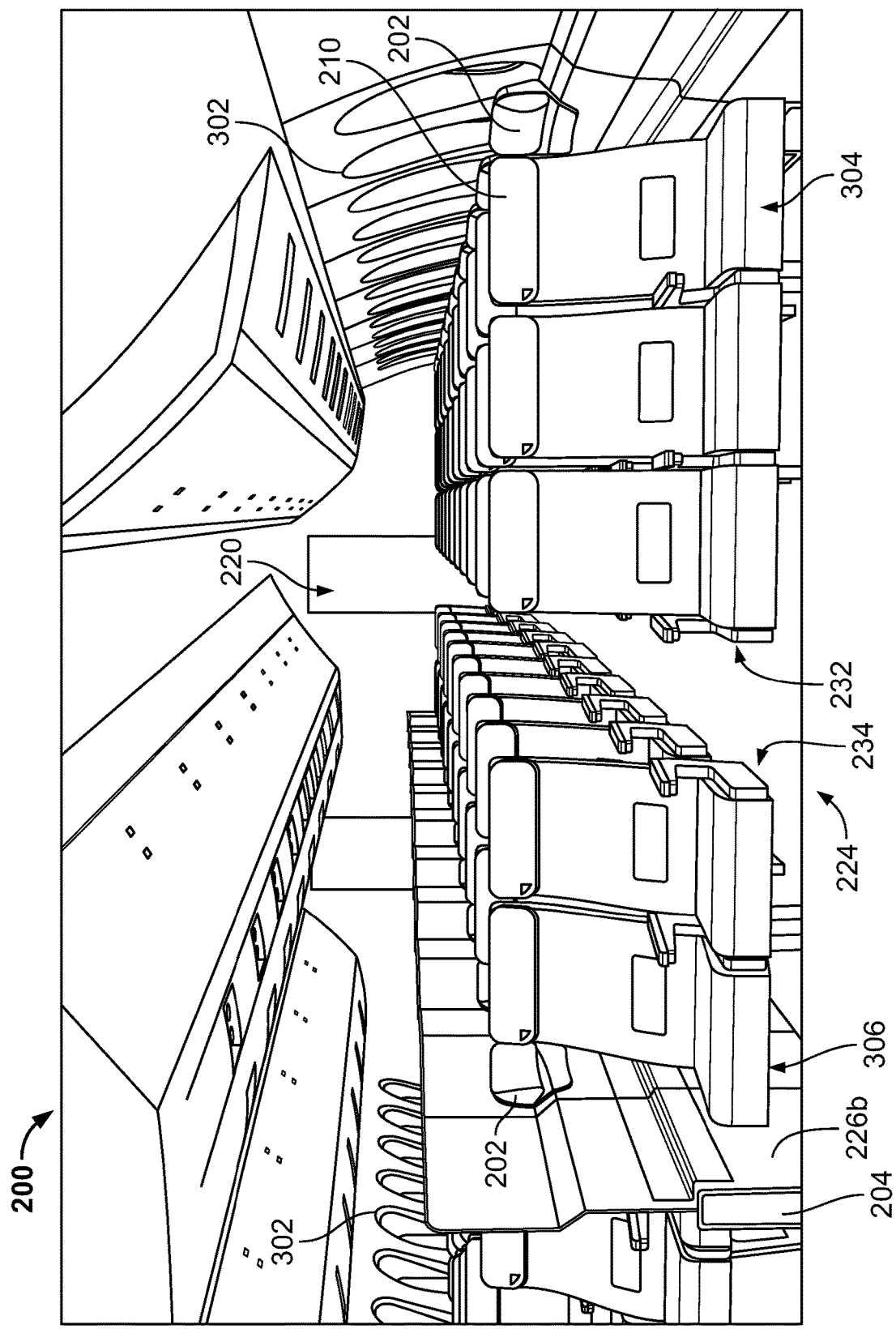
FIG. 3B is a perspective view of an example second portion of the example cabin of FIGS. 2A and 2B.

FIG. 3A is a partial, perspective view of the first portion 218 of the cabin 200 of FIGS. 2A and 2B. FIG. 3B is a partial, perspective view of the second portion 220 of the cabin 200 of FIGS. 2A and 2B. The seats 210 of the first outer rows 228 and the second outer rows 232 immediately adjacent (e.g., coupled to) the fuselage wall 206 (e.g., windows 302 of the fuselage 106) include the lateral sleep apparatus 202 disclosed herein. Likewise, the seats 210 of the first inner rows 230 and the second inner rows 234 immediately adjacent (e.g., coupled to) the divider 204 include the lateral sleep apparatus 202 disclosed herein. Specifically, the fuselage wall 206 supports the lateral sleep apparatus 202 adjacent the windows 302, and the divider 204 supports the lateral sleep apparatus 202 adjacent the first side 226a and the second side 226b of the divider 204. Each of the first outer rows 228 and the second outer rows 232 includes a window seat assembly 304 (e.g., that includes a respective one of the lateral sleep apparatus 202), and each of the first inner rows 230 and the second inner rows 234 includes a divider seat assembly 306 (e.g., that includes a respective one of the lateral sleep apparatus 202).

Figure 4A:
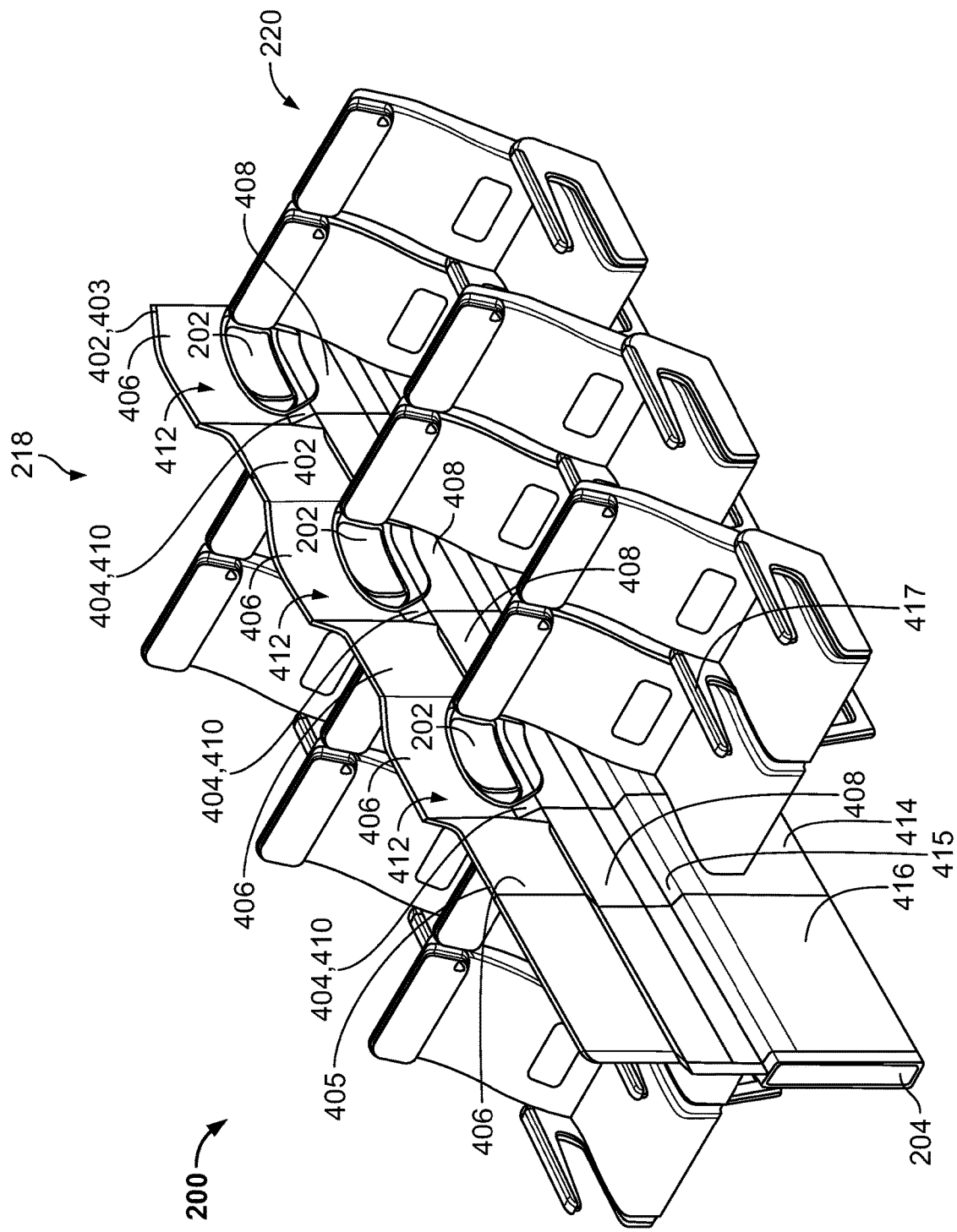
FIG. 4A is another partial, perspective view of the example cabin of FIGS. 2A and 2B.
Figure 4B:
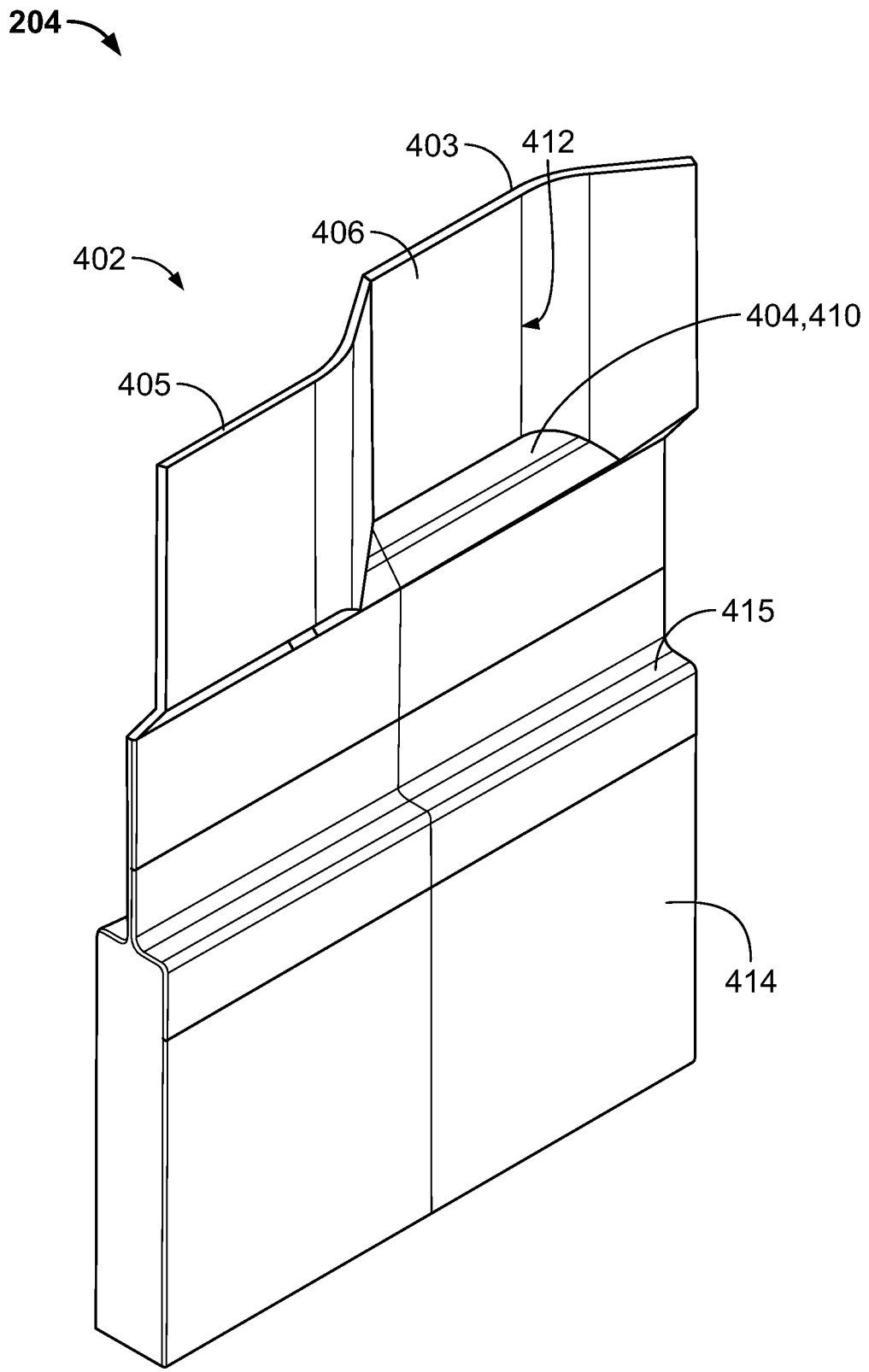
FIG. 4B is a perspective view of a portion of an example divider of FIG. 4A.

FIG. 4A is a partial, perspective view of the cabin 200 of FIGS. 2A-2B and 3A-3B. FIG. 4B is a perspective view of a portion of the divider 204 of FIGS. 2A-2B, 3A-3B and 4A. Referring to FIGS. 4A-4B, the divider 204 is a modular divider that can be configured to fit different aircraft cabin configurations. Thus, the divider 204 is movable, replaceable, and/or configurable to different lengths (e.g., in the fore-aft longitudinal direction). To provide the modular characteristic of the divider 204, the divider 204 includes a plurality of sections or panels 402. For example, one or more the panels 402 of the divider 204 can be removed or added to decrease or increase a longitudinal length (e.g., an overall length) of the divider 204. Additionally, each panel 402 of the divider 204 defines a support wall or support ledge 404 to support a respective one of the lateral sleep apparatus 202. To provide the support ledge 404, the panel 402 includes a first portion 406 (e.g., an upper portion) that is offset relative to a second portion 408 (e.g., a lower portion). A transition 410 couples the first portion 406 and the second portion 408 to define a stepped profile (e.g., the support ledge 404). To provide support to the lateral sleep apparatus 202, the transition 410 of the illustrated example has a tapered or angled profile. For example, the transition 410 can have an angle relative to normal that is between approximately 30 degrees and 60 degrees. However, in some examples, the transition 410 can include an arcuate or curved profile. The offset between the first portion 406 and the second portion 408 defines a cavity or pocket 412 to interface or receive a respective one of the lateral sleep apparatus 202. Alternating the pockets 412 of the divider 204 provides support for the later sleep apparatus 202 on both sides of the divider 204 and increases space of each seat 210 relative to the respective ones of the lateral sleep apparatus 202. As noted above, the pockets 412 of the divider 204 are arranged in an alternating pattern (e.g., a zig-zap pattern) to increase space without requiring removal of seats 210 compared to, for example, a conventional cabin that is not equipped with the lateral sleep apparatus 202. In other words, an orientation of the pockets 412 alternates between the first inner rows 230 of the first portion 218 and the second inner rows 234 of the second portion 220. Further, the panel 402 includes a base 414 having a thickness that is greater than a thickness of the second portion 408 such that a stepped surface is formed between the second portion 408 and the base 414 that can provide an armrest 415 (e.g., an integrated armrest formed in the divider 204). For example, the armrest 415 is at an elevation substantially similar to (e.g., identical or within small manufacturing tolerance) with an elevation of an armrest 417 of the seats 210. Additionally, the divider 204 of the illustrated example includes a straight panel 416 that has a flat profile (e.g., without the pocket 412). In some such examples, one or more seats 210 can be coupled to the straight panel 416 or the straight panel 416 may not include the seats 210 as shown to provide additional leg room and/or walking area.

To enable the pockets 412 to be arranged in alternating fashion, the panels 402 of the illustrated example include a first panel 403 (e.g., a left panel) and a second panel 405 (e.g., a right panel). The first panel 403 is substantially similar in form and dimension relative to the second panel 405, except the first panel 403 is a mirrored structure of the second panel 405. The first panel 403 couples to the second panel 405 via a snap-fit or interference-fit connection. In some examples, the first panel 403 is coupled to the second panel 405 via a fastener(s) (e.g., brackets, screws, etc.). In some examples, the first panel 403 abuts the second panel 405. In some examples, the first panel 403 is fastened to the floor 208 of the cabin 200 and the second panel 405 is fastened to the floor 208 of the cabin 200. In some such examples, the first panel 403 may be attached to the second panel 405 or the first panel 403 may abut the second panel 405.

Figure 5A:
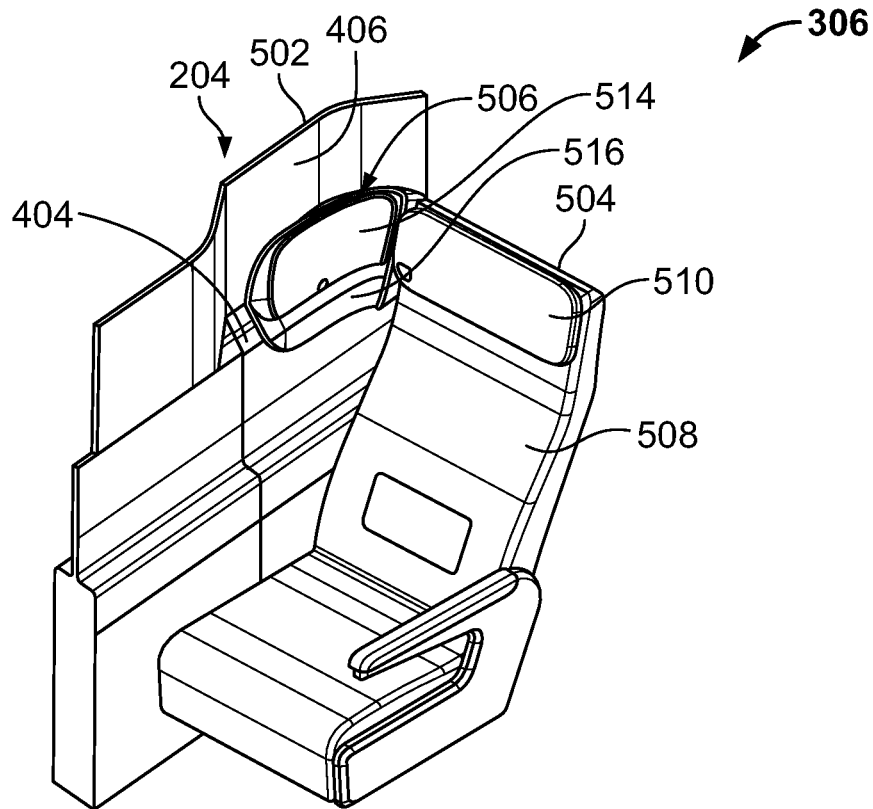
FIG. 5A is a perspective view of an example divider seat assembly of the example cabin of FIGS. 2A and 2B.
Figure 5B:
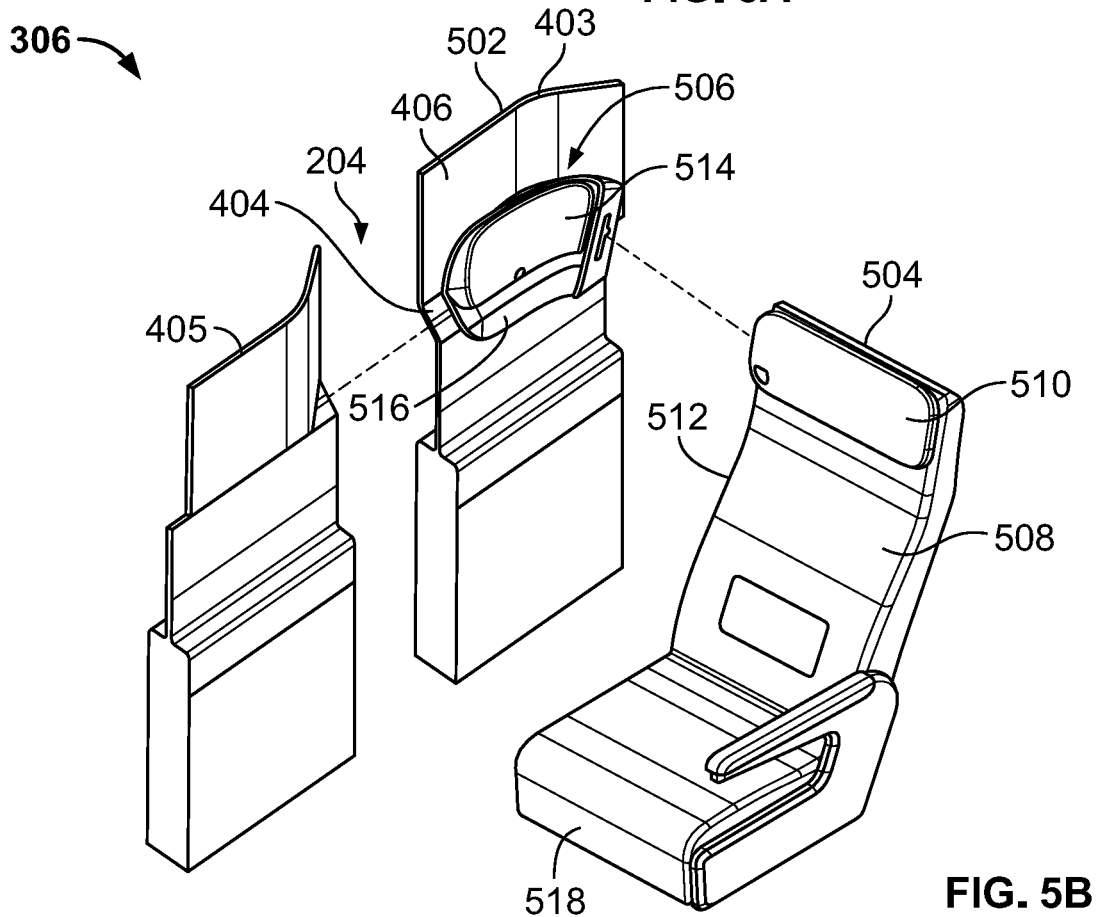
FIG. 5B is a partially exploded view of the example divider seat assembly of FIG. 5A.

FIG. 5A is a partial, perspective view of the divider seat assembly 306 of FIGS. 2A-2B and 3A-3B. FIG. 5B is a partially exploded view of the divider seat assembly 306 of FIG. 5A. Referring to FIGS. 5A and 5B, the divider seat assembly 306 includes a first panel 502 (e.g., the first panel 403) of the divider 204, a seat 504 (e.g., one of the seats 210), and a lateral sleep apparatus 506 (e.g., one of the lateral sleep apparatus 202). The seat 504 of the illustrated example is a chair (e.g., a recliner) that includes a backrest 508 and a headrest 510 (e.g., a first headrest) adjacent the backrest 508. The lateral sleep apparatus 506 of the illustrated couples to the first panel 502 of the divider 204 and a side surface 512 of the seat 504. When coupled to the divider 204, the pocket 412 of the first panel 502 receives (e.g., supports) the lateral sleep apparatus 506 and the support ledge 404 of the first panel 502 supports the lateral sleep apparatus 506.

The lateral sleep apparatus 506 of the illustrated example includes a headrest 514 (e.g., a second headrest) and a cradle 516. Specifically, the cradle 516 couples the headrest 514 to the first panel 502 and the seat 504. The headrest 514 of the lateral sleep apparatus 506 is positioned adjacent or aligned with (e.g., at the same elevation in the vertical direction) the headrest 510 of the seat 504. When positioned adjacent the first panel 502 (e.g., the divider 204) and the seat 504, the headrest 514 of the lateral sleep apparatus 506 projects adjacent the headrest 510 of the seat 504 toward a forward end 518 of the seat 504. Additionally, the pocket 412 initiates at the headrest 510 such that the headrest 514 of the lateral sleep apparatus 506 is positioned adjacent (e.g., at the same elevation as or juxtaposition relative to) the headrest 510 of the seat 504. Thus, the lateral sleep apparatus 506 at least partially extends or projects from (e.g., wraps around) the side surface 512 of the seat 504. In other words, the headrest 510 of the seat 504 and the headrest 514 of the lateral sleep apparatus 506 form a continuous headrest (e.g., a curved headrest) to enhance lateral support by avoiding discontinuity between a transition from the headrest 514 and the lateral sleep apparatus 506. For example, the headrest 510 of the seat 504 and the headrest 514 of the lateral sleep apparatus 506 form an L-shaped profile or shape when the lateral sleep apparatus 506 is positioned adjacent the seat 504.

FIG. 6A is a perspective, assembled view of the first panel 502 and the lateral sleep apparatus 506 of the divider seat assembly 306 of FIGS. 5A and 5B. FIG. 6B is a partially exploded view of the first panel 502 and the lateral sleep apparatus 506 of FIG. 6A. The support ledge 404 of the first panel 502 supports the cradle 516 and the headrest 514 when the cradle 516 is positioned adjacent (e.g., coupled to or supported by) the first panel 502. Specifically, the cradle 516 includes a contoured shape or profile to engage the first panel 502 (e.g., the support ledge 404) of the divider 204. In the illustrated example, the cradle 516 includes a first portion 602 (e.g., an upper portion) that is contoured to (e.g., mateably) engage the first portion 406 (e.g., the upper portion) of the first panel 502, a second portion 604 (e.g., a lower portion) that is contoured to (e.g., mateably) engage the second portion 408 (e.g., the lower portion) of the first panel 502, and a third portion or transition 606 that is contoured to (e.g., mateably) engage the support ledge 404 of the first panel 502. Thus, a cross-sectional profile of the cradle 516 taken along a longitudinal axis (e.g., a vertical axis) of the cradle 516 is similar or complementary to a cross-sectional profile of the first panel 502 taken along a longitudinal axis (e.g., a vertical axis) of the first panel 502. The headrest 514 includes a cushion that is covered by a fabric. For example, the headrest 514 can be a core (e.g., a foam material) that is covered by a fabric (e.g., a plastic or vinyl fabric). In some examples, the headrest 514 of the lateral sleep apparatus 506 is composed of the same material as the headrest 510 of the seat 504. The cradle 516 can be formed of metal, plastic, fiberglass, and/or any other material(s). The cradle 516 can be formed via molding, machining, additive manufacturing (e.g., 3-D printing) and/or any other manufacturing processes.

Referring to FIGS. 6A and 6B, the lateral sleep apparatus 506 of the illustrated example includes a first attachment assembly 608 (e.g., a support structure attachment assembly), a second attachment assembly 610 (e.g., a seat attachment assembly), and an adjustor 612. The first attachment assembly 608 couples the lateral sleep apparatus 506 (e.g., the cradle 516) to the first panel 502 of the divider 204 and the second attachment assembly 610 couples the lateral sleep apparatus 506 (e.g., the cradle 516) to the seat 504. The first attachment assembly 608 of the illustrated example enables the lateral sleep apparatus 506 to move (e.g., translate) in a first linear direction 614 (e.g., a horizontal direction) relative to the first panel 502. The second attachment assembly 610 of the illustrated example enables the seat 504 of the illustrated example to move (e.g., translate) in a second linear direction 616 (e.g., an angled direction relative to horizontal and vertical) and/or rotate in rotational directions 618 (e.g., a first rotational direction 618a or counterclockwise direction and a second rotational direction 618b or clockwise direction) relative to the cradle 516. Further, the adjustor 612 enables the headrest 514 to move (e.g., translate) in a third linear direction 620 (e.g., a vertical direction) relative to the cradle 516.

Figure 7A:
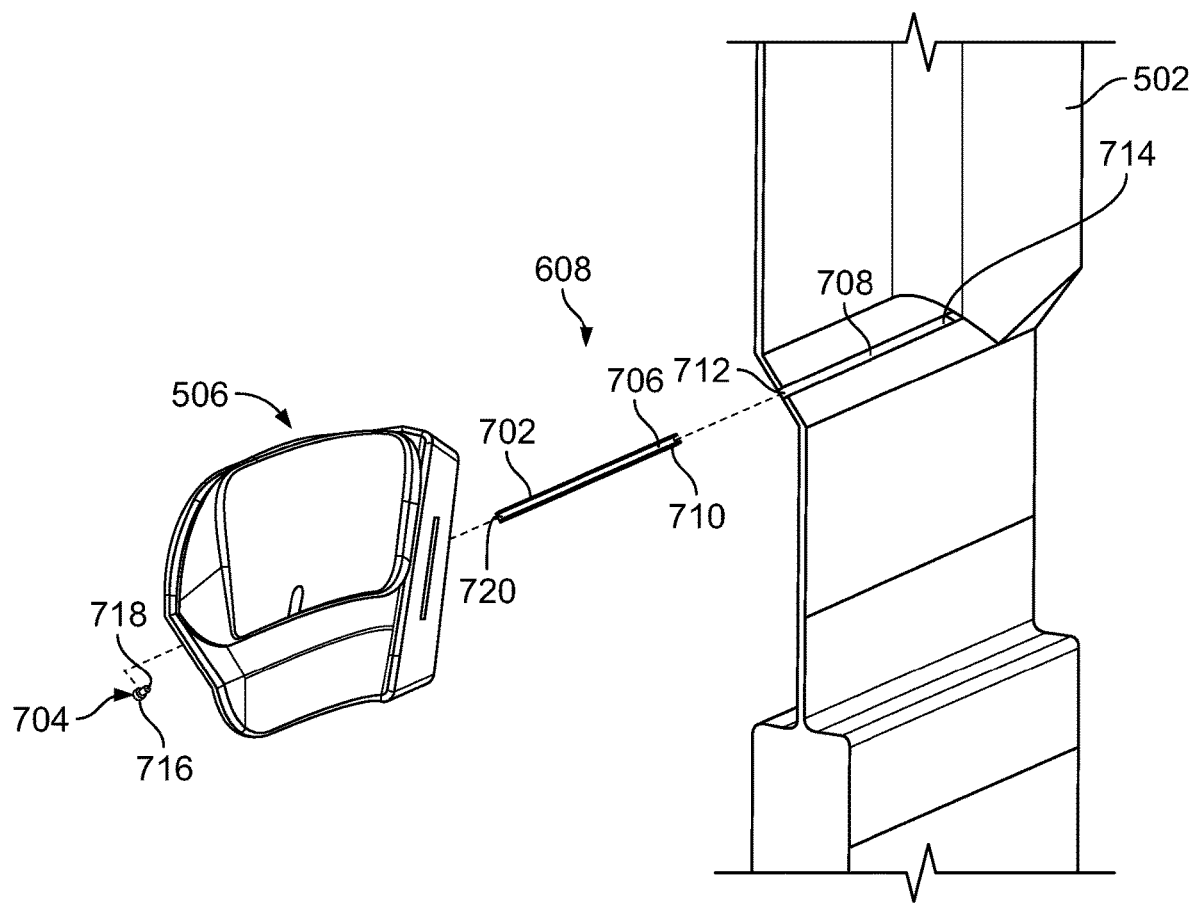
FIG. 7A is a perspective front, partially exploded view of the example first panel and the example lateral sleep apparatus of FIGS. 5A-5B and 6A-6B, showing an example first attachment assembly.
Figure 7B:
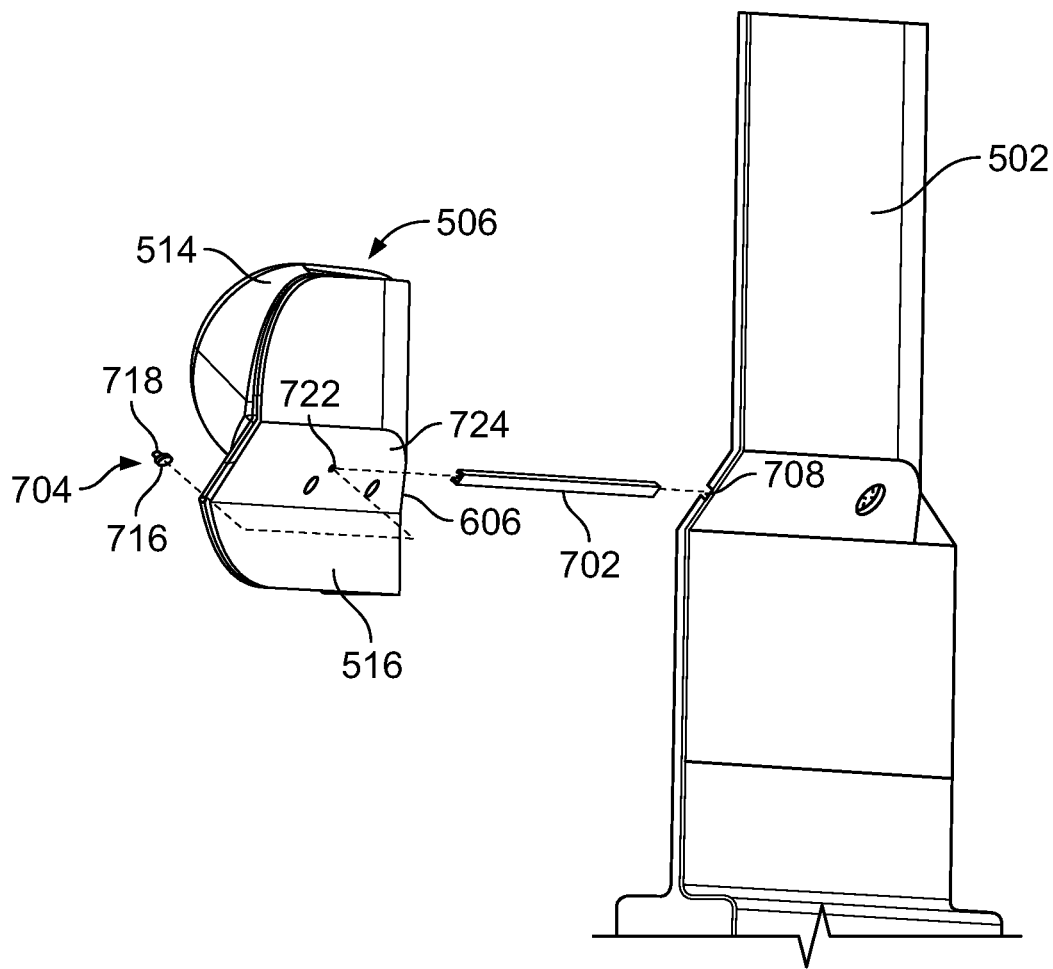
FIG. 7B is a perspective rear, partially exploded view of the example first panel and the example lateral sleep apparatus of FIG. 7A.

FIG. 7A is a perspective front, partially exploded view of the first panel 502 and the lateral sleep apparatus 506 of FIGS. 5A-5B and 6A-6B. FIG. 7B is a perspective rear, partially exploded view of the first panel 502 and the lateral sleep apparatus 506 of FIG. 7A. The first attachment assembly 608 couples the cradle 516 to the first panel 502 of the divider 204. The first attachment assembly 608 includes a track 702 and a slider 704. The track 702 is coupled to the first panel 502. The track 702 has a C-shaped profile. In other words, the track 702 includes side arms projecting from a lower surface to define an opening 706 and flanges at respective upper ends of the side arms opposite the lower surface that project toward a longitudinal axis of the opening 706. For example, the flanges are non-parallel (e.g., perpendicular) relative to the side arms. The flanges retain the slider 704 coupled to the track 702.

To couple the track 702 to the first panel 502, the first panel 502 includes a channel 708 (e.g., a slot, opening or recessed cavity). The channel 708 of the illustrated example forms an opening or cavity having a shape or profile to mateably receive the track 702. For example, the channel 708 of the illustrated example has a C-shaped profile. To couple the track 702 to the first panel 502, the track 702 is positioned within the channel 708. For example, a first end 710 of the track 702 can be slid into the channel 708 from one end 712 of the channel 708 to another end 714 of the channel 708. The track 702 can be coupled (e.g., secured) to the first panel 502 via a fastener (e.g., a screw, a rivet, etc.), adhesive, friction-fit connection, and/or any other fastener(s). In the illustrated example, the channel 708 is formed in (e.g., and/or the track 702 is supported by) the support ledge 404 of the first panel 502. However, in some examples, the channel 708 and/or the track 702 can be positioned on the first portion 406 and/or the second portion 408 of the first panel 502. In some examples, the first panel 502 does not include the channel 708, and the track 702 can be positioned on (e.g., fixed to) an outer surface (e.g., of the support ledge 404) of the first panel 502.

The slider 704 includes a base 716 (e.g., a rectangular shaped base) and a post 718 (e.g., a cylindrical shaped boss) protruding from the base 716. The base 716 of the slider 704 is slidably positioned in the opening 706 of the track 702 and can move within the track 702 between the first end 710 of the track 702 and a second end 720 of the track 702 opposite the first end 710. The slider 704 is coupled or fastened (e.g., fixed) to the cradle 516. Specifically, the cradle 516 includes an opening 722 on a rear surface 724 of the transition 606 to receive the post 718 of the slider 704. The slider 704 and/or the base 716 is oriented toward the track 702 when the cradle 516 is adjacent (e.g., coupled to or supported by) the first panel 502. The post 718 can be coupled to the opening 722 of the cradle 516 via a snap-fit connection, a friction-fit connection, threads, a locking pin, and/or any other fastener (e.g., or means) to secure the slider 704 to the cradle 516. In some examples, the slider 704 can be coupled to the cradle 516, and the base 716 of the slider 704 can be positioned in the opening 706 of the track 702. In some examples, the slider 704 can be positioned in the track 702, and the cradle 516 can be coupled to the post 718 while the slider 704 is positioned in the track 702. The engagement between the slider 704 and the track 702 enables the cradle 516 and, thus, the headrest 514 to move in the first linear direction 614 (FIG. 6A) between the first end 710 of the track 702 and the second end 720 of the track 702 relative to the first panel 502 of the divider 204.

Figure 8:
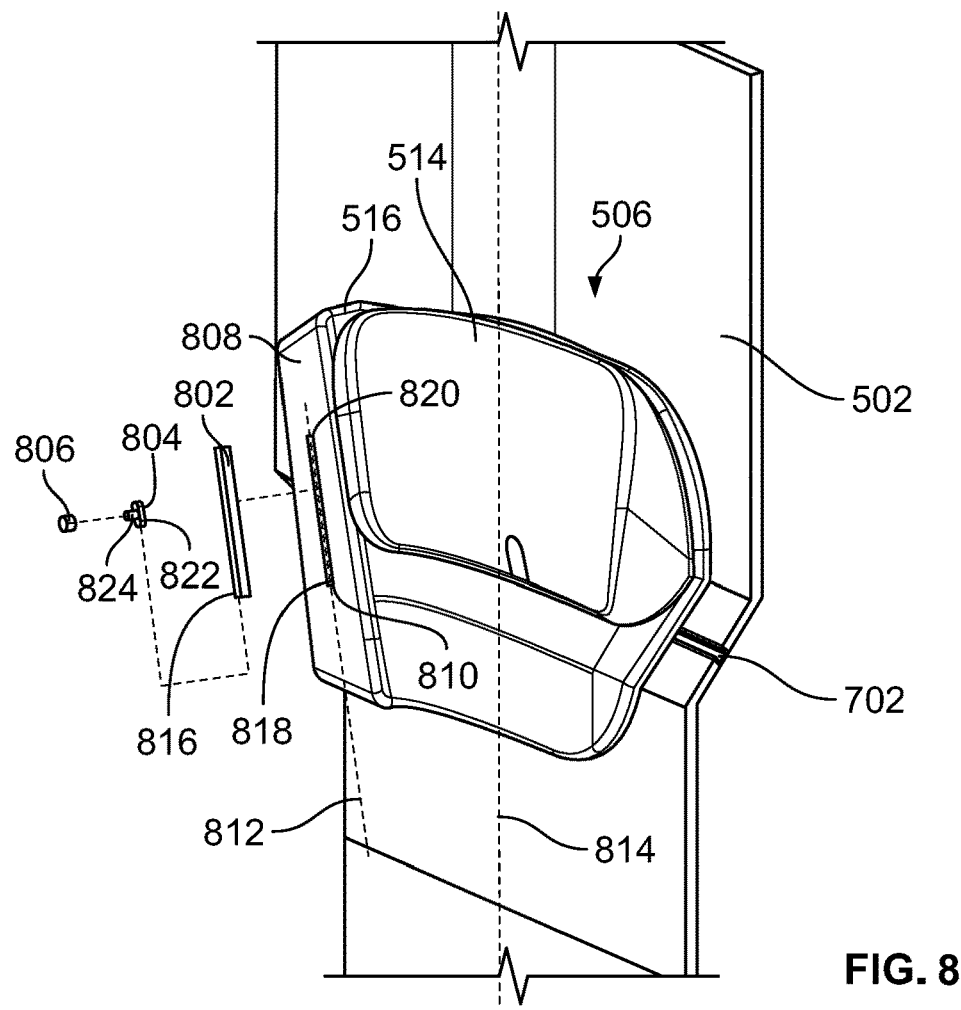
FIG. 8 is a front, partially exploded view of the example first panel and the example lateral sleep apparatus of FIGS. 5A-5B and 6A-6B, showing an example second attachment assembly.

FIG. 8 is a front, partially exploded view of the first panel 502 and the lateral sleep apparatus 506 of FIGS. 5A-5B and 6A-6B. The second attachment assembly 610 is coupled to the cradle 516. The second attachment assembly 610 includes a track 802, a slider 804, and a pivot 806. Specifically, the cradle 516 includes a seat mounting interface 808 to couple to the seat 504. The seat mounting interface 808 receives and/or supports the second attachment assembly 610. The seat mounting interface 808 of the cradle 516 includes a slot 810 (e.g., a channel or a cavity). The slot 810 of the seat mounting interface 808 has a longitudinal axis 812 that is angled or canted relative to vertical 814 (e.g., a longitudinal axis of the cradle 516). The slot 810 of the illustrated example receives the track 802. The track 802 of the second attachment assembly 610 has a cross-sectional profile or shape that is substantially similar to a cross-sectional profile or shape of the track 702. For example, the track 802 has an opening 816 to receive the slider 804 and the track 802 retains the slider 804 coupled to the track 802 as the slider moves within the track 802 between a first end 818 of the track 802 and a second end 820 of the track 802 opposite the first end 818. The slider 804 of the illustrated example includes a base 822 to engage the track 802 and a protrusion 824 (e.g., a shaft or a post) to receive or support the pivot 806. The base 822 of the slider 804 is coupled to the track 802, and the track 802 retains the slider 804 when the slider 804 is coupled to the track 802. The pivot 806 is rotatably coupled to the protrusion 824 of the slider 804 and can rotate relative to the slider 804 and/or the track 802 in the rotational directions 618 (FIG. 6A). For example, the pivot 806 can be a bushing coupled to the protrusion 824. To this end, the pivot 806 can rotate relative to the slider 804 as the slider 804 moves (e.g., slides or translates) within the track 802 in the second linear direction 616 (FIG. 6A) between the first end 818 and the second end 820. The slider 804 and the pivot 806 are coupled to the track 802 prior to the track 802 is coupled to the cradle 516. In some examples, the pivot 806 and the slider 804 are coupled to the track 802, and the track 802 (e.g., including the slider 804 and pivot 806) is coupled to the cradle 516 via a fastener, adhesive, friction fit connection, a snap-fit connection, a loop-and-hook connection, and/or any other fastener(s). In some examples, the cradle 516 is overmolded with the track 802, the slider 804 and the pivot 806. When positioned adjacent (e.g., coupled to or supported by) the seat 504, the seat mounting interface 808 interacts or provides an interface with (e.g., mateably engages) an attachment interface of the seat 504. For example, the pivot 806 is coupled to the side surface 512 (FIG. 5B) of the seat 504.

Figure 9:
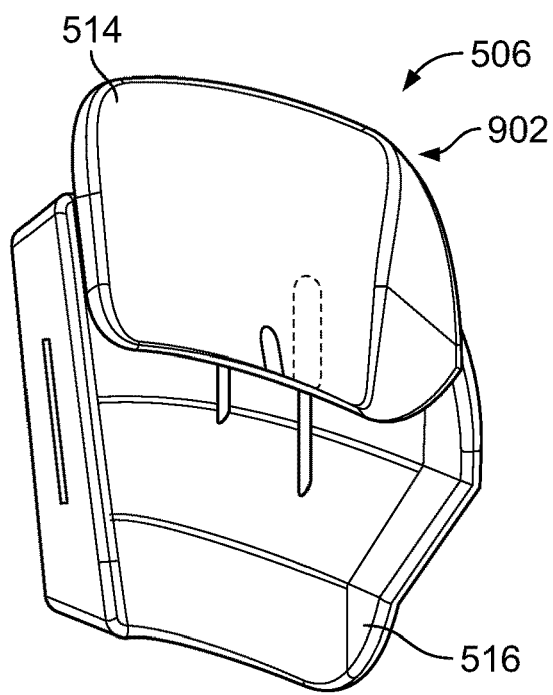
FIG. 9 is a perspective view of the example lateral sleep apparatus of FIGS. 5A-5B, 6A-6B, 7A-7B and 8, showing an example adjustor.

FIG. 9 is a perspective view of the lateral sleep apparatus 506 of FIGS. 5A-5B, 6A-6B, 7A-7B and 8. Specifically, the headrest 514 is shown in a raised position 902 relative to the cradle 516. The adjustor 612 enables the headrest 514 to move (e.g., slide) relative to the cradle 516 between a retracted or lowered position and the raised position 902.

Figure 10B:
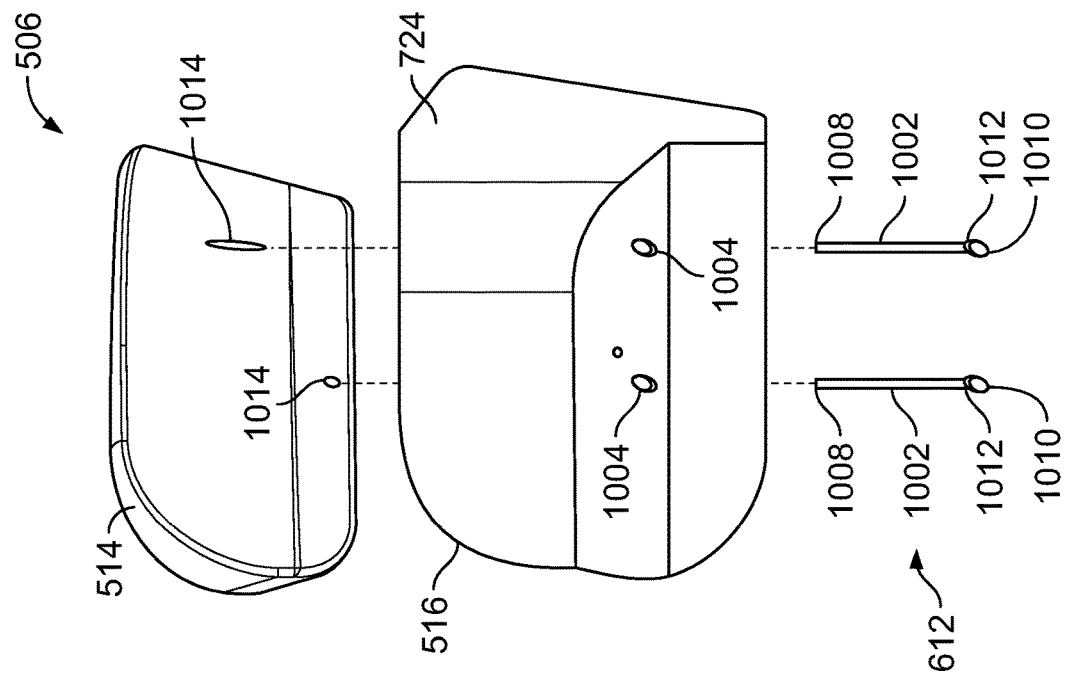
FIG. 10B is a perspective rear, partially exploded view of the example lateral sleep apparatus of FIG. 10A.
Figure 10A:
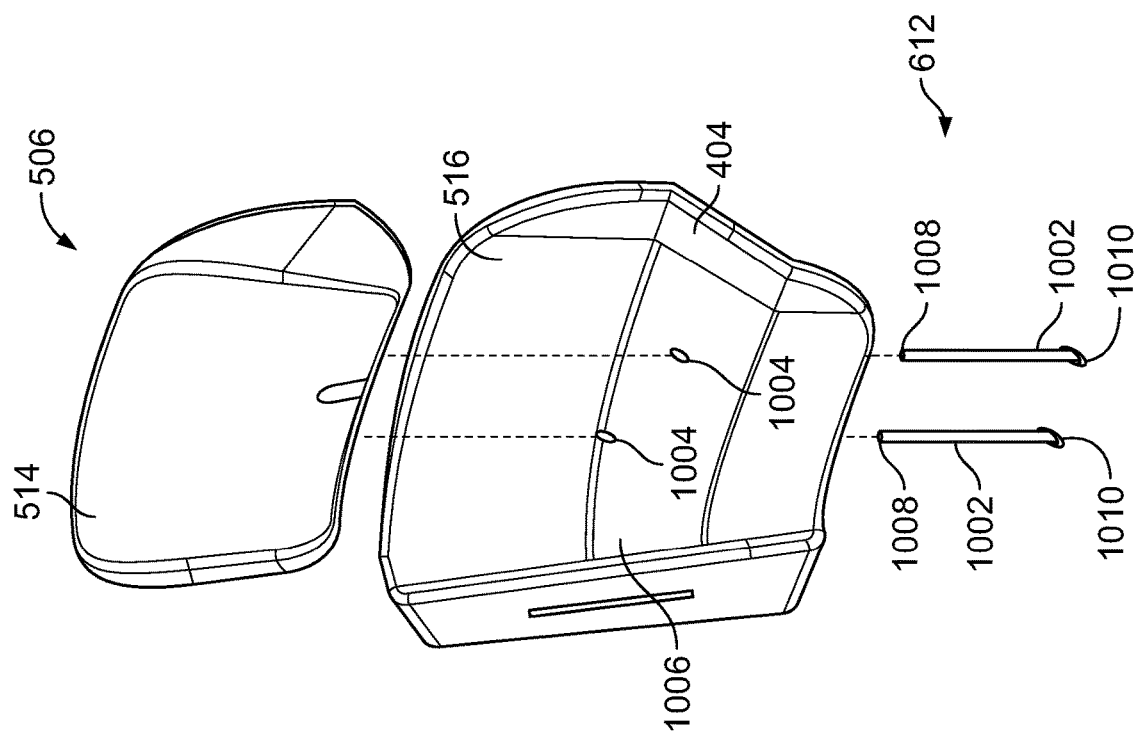
FIG. 10A is a perspective front, partially exploded view of the example lateral sleep apparatus of FIG. 9.

FIG. 10A is a perspective front, partially exploded view of the lateral sleep apparatus 506 of FIG. 9. FIG. 10B is a perspective rear, partially exploded view of the lateral sleep apparatus 506 of FIGS. 9 and 10A. To enable the headrest 514 to move relative to the cradle 516, the adjustor 612 includes headrest pins 1002 (e.g., posts or rods). To receive the headrest pins 1002, the cradle 516 of the illustrated example includes openings 1004. The openings 1004 are formed on the rear surface 724 of the cradle 516 and extend to a front surface 1006 of the cradle 516. In other words, the openings 1004 extend through the transition 410 of the cradle 516 between the rear surface 724 and the front surface 1006.

To couple the headrest pins 1002 to the cradle 516, first ends 1008 of the headrest pins 1002 are positioned in respective ones of the openings 1004. Each of the headrest pins 1002 includes a base 1010 to prevent the second ends 1012 of the headrest pins 1002 from passing through the openings 1004. For example, the base 1010 of each headrest pin 1002 is positioned in a respective one of the openings 1004, but the bases 1010 cannot pass through the openings 1004 to the front surface 1006 of the cradle 516. In some examples, the base 1010 is substantially flush with the rear surface 724. In some examples, the base 1010 couples to the cradle 516 via a friction-fit connection, a press-fit, a snap-fit connection, and/or any other fastener(s). The headrest pins 1002 project from the transition 410 in an upward direction relative to the front surface 1006 when the headrest pins 1002 are coupled to the cradle 516. The headrest 514 includes openings 1014 (e.g., guide sleeves) to receive the first ends 1008 of the headrest pins 1002. For example, the first ends 1008 of the headrest pins 1002 are slidably received within the openings 1014 of the headrest 514 when the headrest 514 moves or slides relative to the cradle 516. In the illustrated example, the adjustor 612 includes two headrest pins 1002. However, in some examples, the adjustor 612 can include one headrest pin or more than two headrest pins.

Figure 11B:
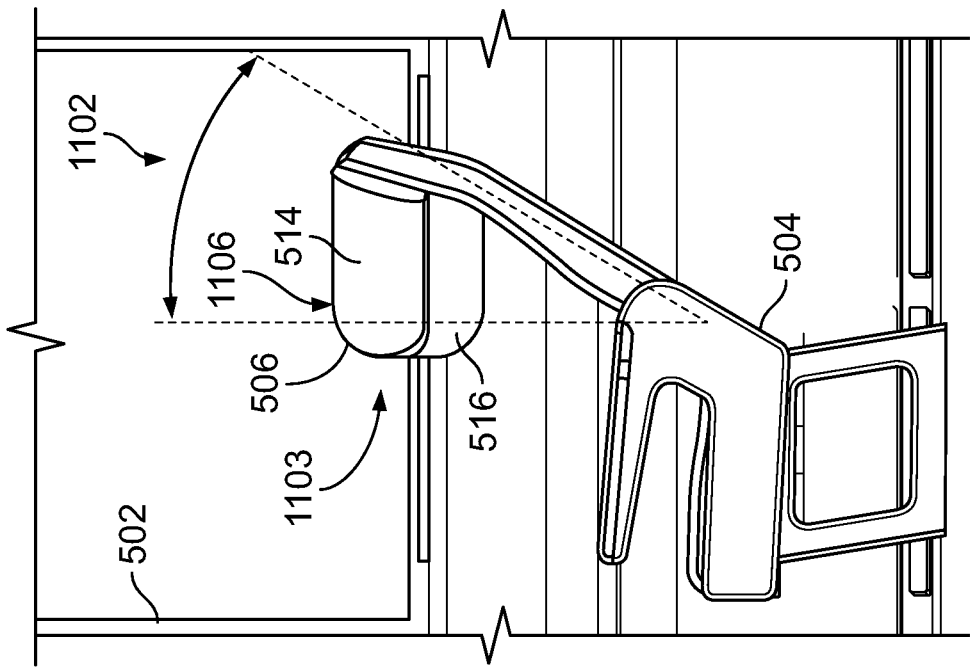
FIG. 11B is a side view of the example divider seat of FIGS. 5A-5B, 6A-6B, 7A-7B, 8 and 9 shown in a second position and the example lateral sleep apparatus shown in a second lateral position.
Figure 11A:
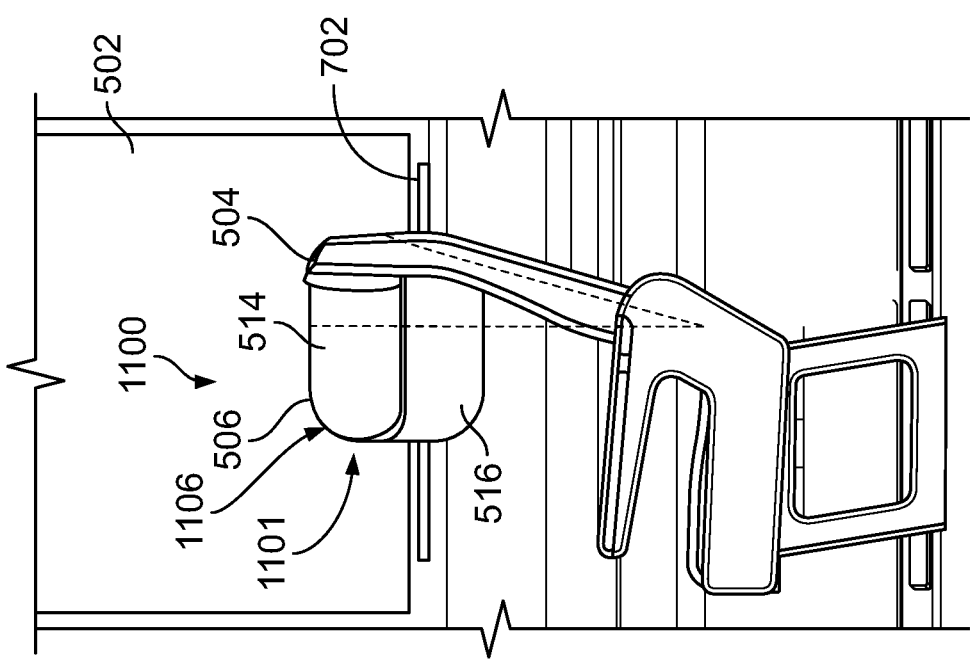
FIG. 11A is a side view of the example divider seat assembly of FIGS. 5A-5B, 6A-6B, 7A-7B, 8 and 9 shown in a first position and the example lateral sleep apparatus shown in a first lateral position.

FIG. 11A is a side view of the seat 504 in an upright position 1100 and the lateral sleep apparatus 506 in a first lateral position 1101. FIG. 11B is a side view of the seat 504 in a reclined position 1102 and the lateral sleep apparatus 506 in a second lateral position 1103. The lateral sleep apparatus 506 moves relative to the first panel 502 and/or the divider 204 between the first lateral position 1101 and the second lateral position 1103 when the seat 504 moves between the upright position 1100 and the reclined position 1102. Specifically, the lateral sleep apparatus 506 translates (e.g., in a horizontal direction) relative to the first panel 502 in the first linear direction 614. In other words, the slider 704 moves within the track 702 of the first panel 502 between the first end 710 and the second end 720 of the track 702 to enable the lateral sleep apparatus 506 (e.g., the cradle 516) to move laterally with the seat 504 between the first lateral position 1101 and the second lateral position 1103 when the seat 504 moves between the upright position 1100 and reclined position 1102.

Further, the second attachment assembly 610 maintains an elevation (e.g., a vertical height relative to the floor 208) of the headrest 514 relative the headrest 510 of the seat 504 when the seat 504 moves between the upright position 1100 and the reclined position 1102. Specifically, the slider 804 moves within the track 802 between the first end 818 of the track 802 and the second end 820 in the second linear direction 616 when the seat 504 moves between the upright position 1100 and reclined position 1102 and the lateral sleep apparatus 506 moves between the first lateral position 1101 and the second lateral position 1103. Additionally, the seat 504 pivots or rotates in the rotational directions 618 relative to the cradle 516 and/or the lateral sleep apparatus 506 via the pivot 806 when the seat 504 moves between the upright position 1100 and reclined position 1102 and the lateral sleep apparatus 506 moves between the first lateral position 1101 and the second lateral position 1103. Further, the headrest 514 can move in the third linear direction 620 (e.g., vertically) relative to the cradle 516 via the adjustor 612 to adjust a position of the headrest 514 relative to the cradle 516 between a lowered position 1106 (e.g., a fully lowered position) and the extended position 902 when the seat 504 is in the upright position 1100 and/or the reclined position 1102.

Figure 12A:
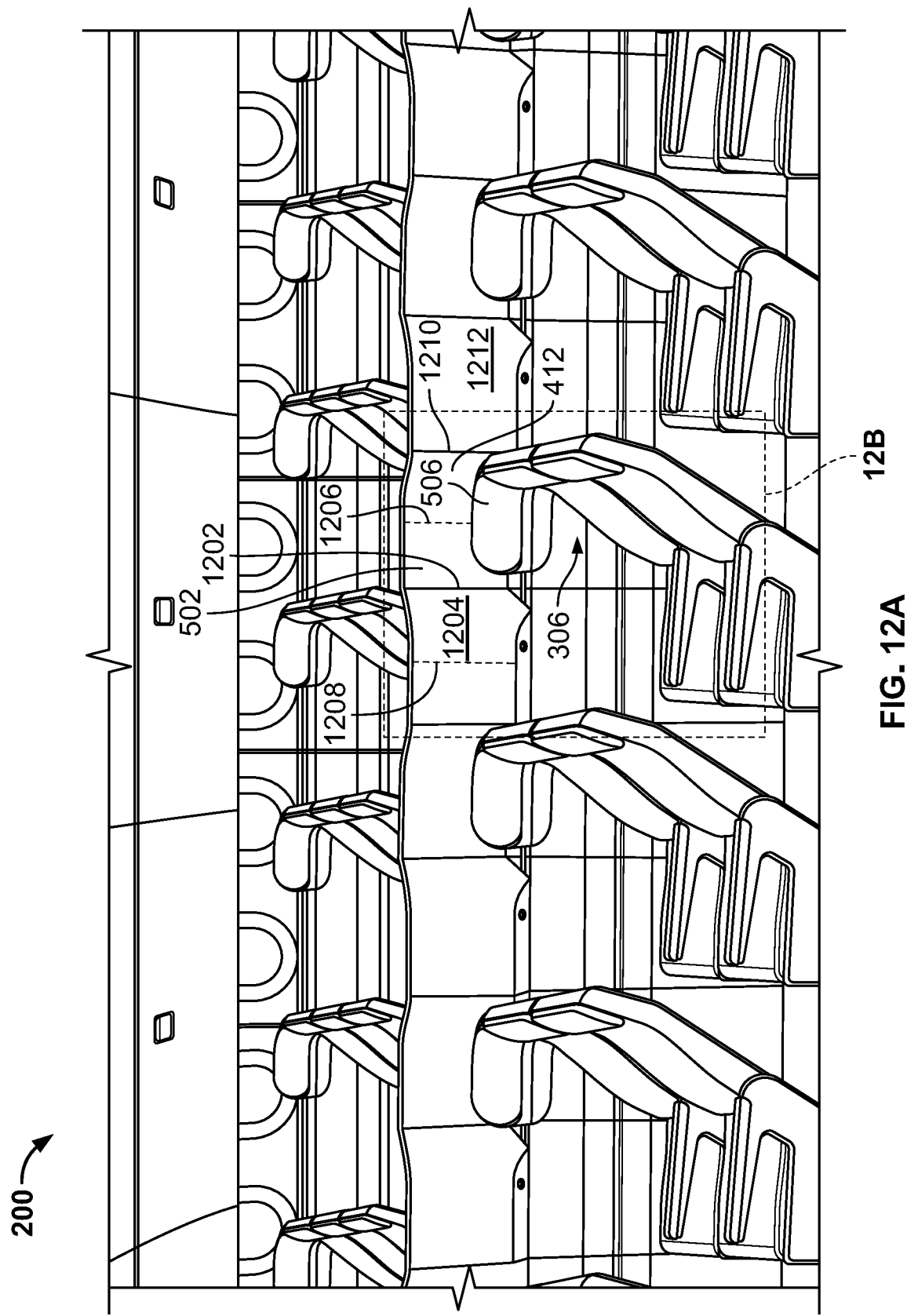
FIG. 12A is a partial side view of the example cabin of FIGS. 2A-2B, 3A-3B and 4.

FIG. 12A is a partial, side view of the cabin 200 of FIGS. 2A-2B, 3A-3B and 4. To prevent partition lines between the panels 402 from interfering with movement of the seats 210 and/or the lateral sleep apparatus 202, the partition lines are positioned outside the travel paths of the lateral sleep apparatus 202. For example, to prevent a first partition line 1202 between the first panel 502 and a second panel 1204 (e.g., the second panel 405 of FIG. 4B) adjacent (e.g., in contact with or connected to) the first panel 502 from interfering with movement of the seat 504, the first partition line 1202 between the first panel 502 and the second panel 1204 is positioned outside a travel path of the lateral sleep apparatus 506. For example, the first partition line 1202 does not interfere with movement of the lateral sleep apparatus 506 between the first lateral position 1101 and the second lateral position 1103 when the seat 504 moves between the upright position 1100 (e.g., a fully upright position) and the reclined position 1102 (e.g., a fully reclined position). To this end, the first partition line 1202 between the first panel 502 and the second panel 1204 is offset relative to a centerline 1206 (e.g., a vertical centerline) of the first panel 502 and a centerline 1208 (e.g., a vertical centerline) of the second panel 1204. To provide the first partition line 1202, a portion of the first panel 502 and a portion of the second panel 1204 form or define the pocket 412 of the first panel 502. For example, the lateral sleep apparatus 506 corresponding to the first panel 502 is positioned between the first partition line 1202 and a second partition line 1210 defined between the first panel 502 and a third panel 1212 adjacent the first panel 502. In other words, the first panel 502 is positioned between the second panel 1204 and the third panel 1212. To this end, the lateral sleep apparatus 506 is positioned between the first partition line 1202 and the second partition line 1210. For example, the track 702 (i.e., the first end 710 and the second end 720 of the track 702) is positioned between the first partition line 1202 and the second partition line 1210. Additionally, such configuration improves an aesthetic appeal of the divider 204 and/or facilitates assembly of the panels 402. In some examples, the panels 402 can include indicia identifying the seats 210.

Figure 12B:
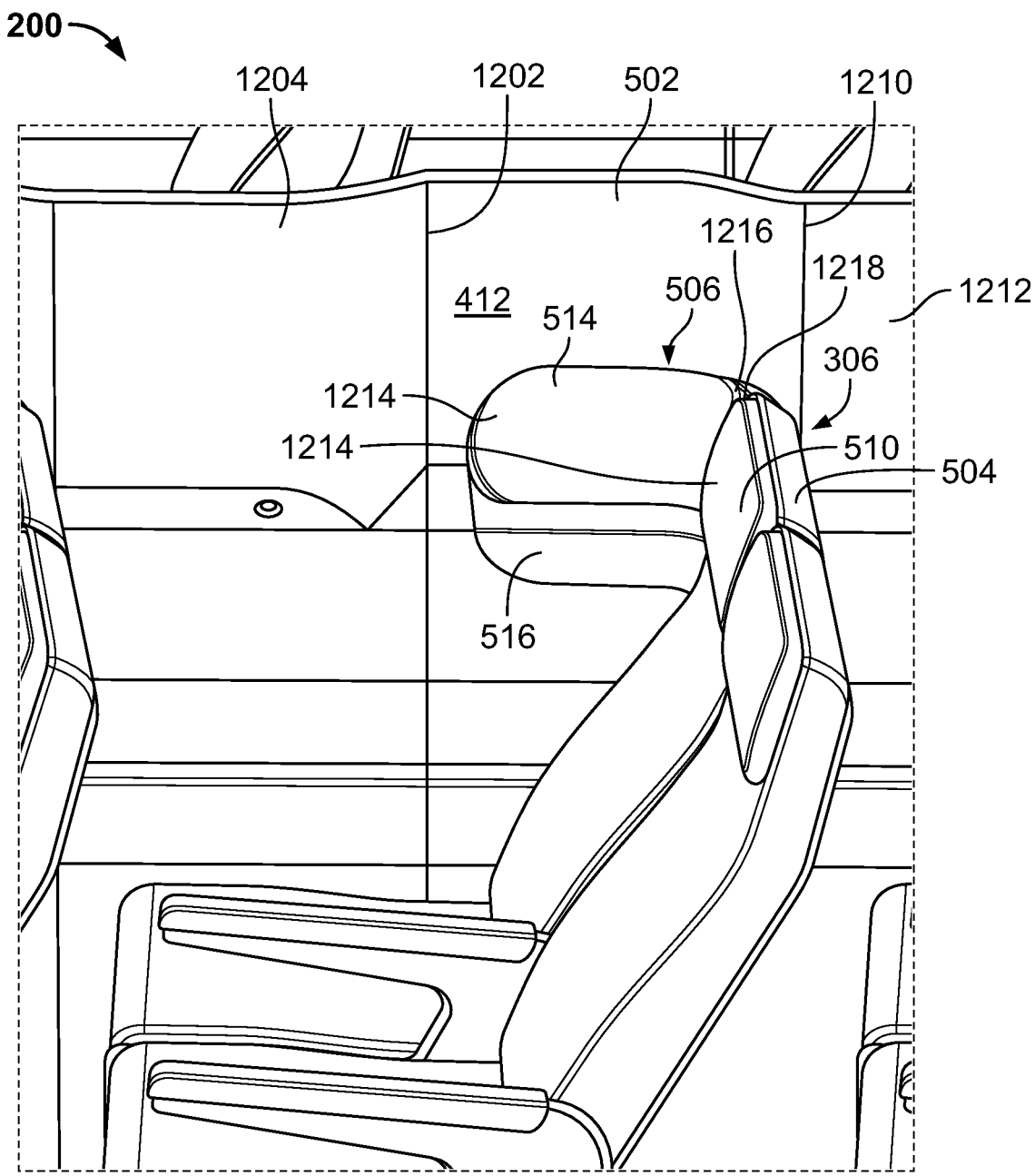
FIG. 12B is an enlarged view of a portion of the example cabin of FIG. 12A.

FIG. 12B is an enlarged view of a portion of the cabin 200 of FIG. 12A. Referring to FIG. 12B, the seat mounting interface 808 of the cradle 516 is offset or adjacent to the headrest 514. In this manner, when the cradle 516 is positioned adjacent (e.g., supported by or coupled to) the seat 504, the headrest 514 of the lateral sleep apparatus 506 is adjacent the headrest 510 of the seat 504 such that the headrests 514 and 510 form a continuous resting surface 1214. For example, an end 1216 of the headrest 514 of the lateral sleep apparatus 506 is oriented toward (e.g., is curved toward) an end 1218 (e.g., an abutting end) of the headrest 510 of the seat 504 when the headrest 514 is coupled to the cradle 516. For example, the end 1216 of the headrest 514 of the lateral sleep apparatus 506 abuts or engages the end 1218 of the headrest 510 of the seat 504.

Figure 13:
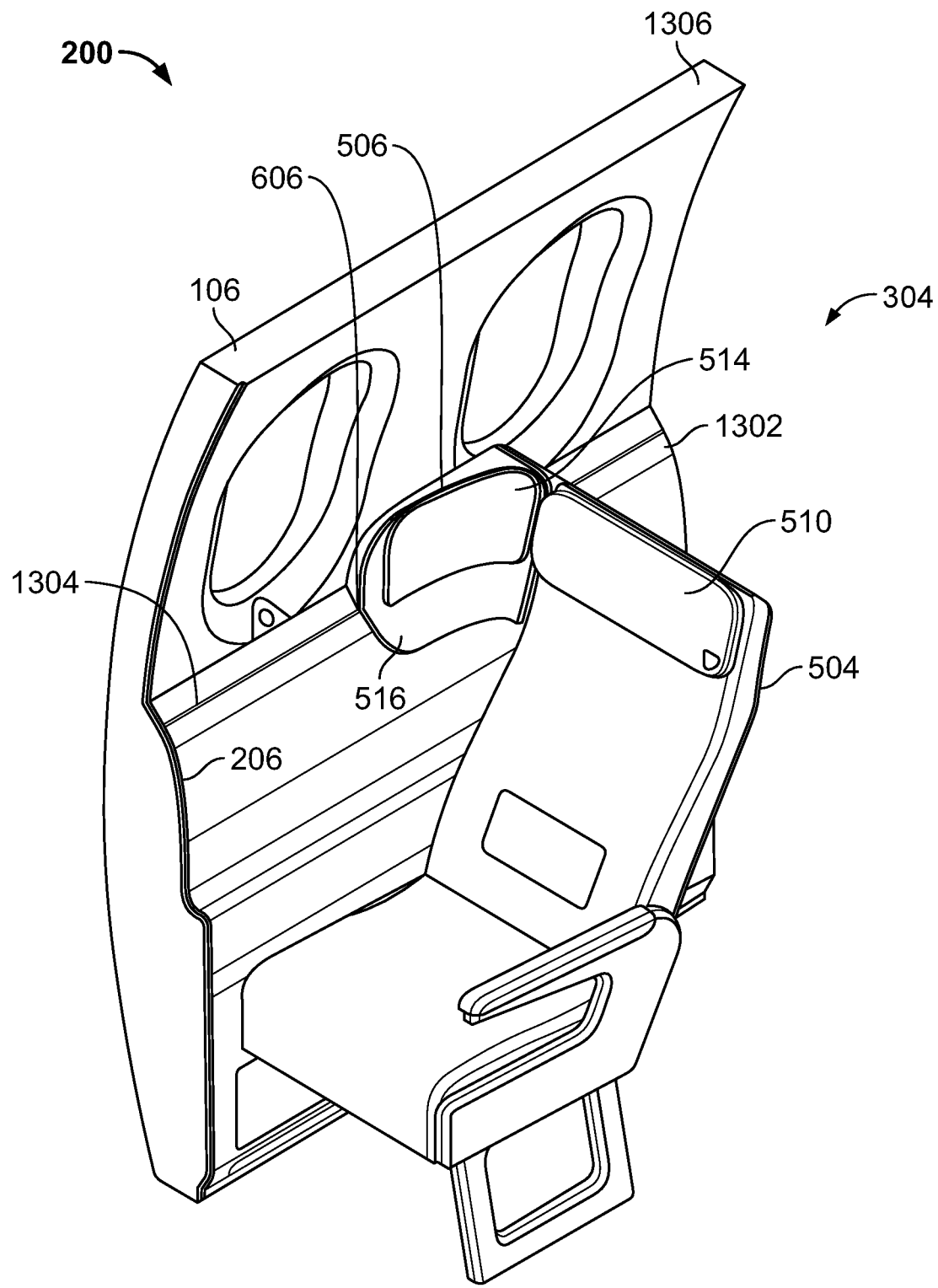
FIG. 13 is a perspective view of an example window seat assembly of the example cabin of FIGS. 2A-2B and 3A-3B.

FIG. 13 is a perspective view of the window seat assembly 304 of FIGS. 2A-2B and 3A-3B. The window seat assembly 304 includes the lateral sleep apparatus 506 and the seat 504. However, unlike the lateral sleep apparatus 506 of the divider seat assembly 306 of FIGS. 5A-5B, 6A-6B, 7A-7B, 8, 9, 10A-10B, 11A-11B, and 12A-12B, the lateral sleep apparatus 506 of the window seat assembly 304 couples to the fuselage wall 206 of the fuselage 106. To receive the cradle 516, the fuselage wall 206 of the illustrated example includes a support structure or support ledge 1302. The support ledge 1302 has a shape or contour to (e.g., to mateably) engage the transition 606 of the cradle 516. To receive the track 702 of the first attachment assembly 608, the fuselage wall 206 includes a channel 1304. The channel 1304 of the fuselage wall 206 is a channel 1304 (e.g., a continuous channel) extending across a section or portion 1306 of the fuselage 106. The channel 1304 can be formed in the fuselage wall 206 during manufacturing of the fuselage 106 and/or assembly of the aircraft 100. In some examples, a fuselage wall of an existing aircraft can be retrofit to include the channel 1304. In some examples, the channel 1304 may not be formed in the fuselage wall 206 and the track 702 can be coupled or attached to an outer surface of the fuselage wall 206 via, for example, screws, adhesive, a hook-and-loop fastener, and/or any other fastener(s). In some examples, the cradle 516 is supported by (e.g., positioned on top of) the fuselage wall 206 without use of a fastener. In some examples, the cradle 516 is supported by (e.g., positioned on top of) the fuselage wall 206 (e.g., without the track 702) and coupled to the fuselage wall 206 via adhesive. In some examples, the divider 204 can include the track 702, and the fuselage wall 206 does not include the track 702.

Figure 14B:
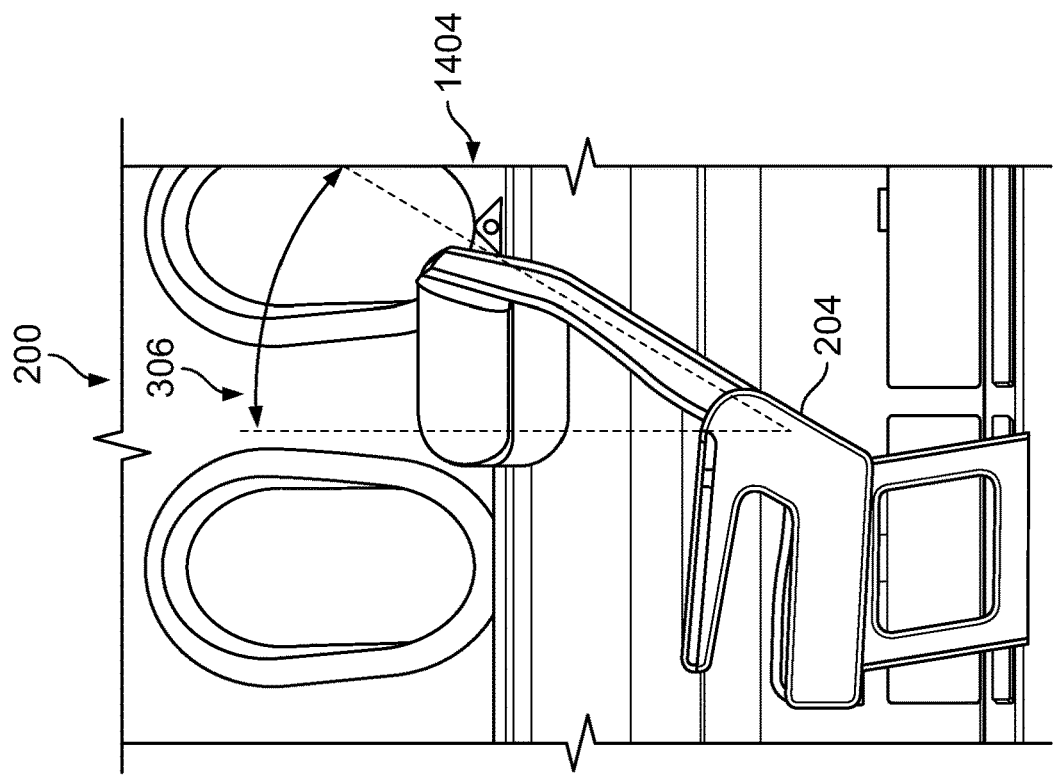
FIG. 14B is a side view of the example window seat of FIG. 13 shown in a second position.
Figure 14A:
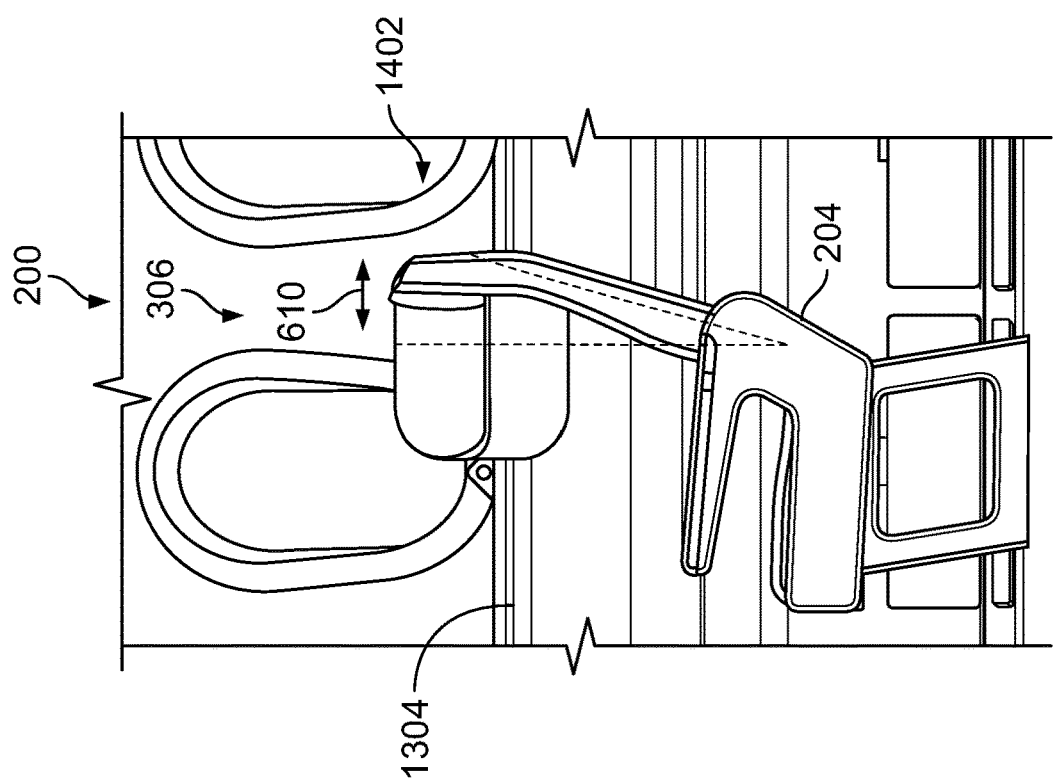
FIG. 14A is a side view of the example window seat of FIG. 13 shown in a first position.

FIG. 14A is a side view of the window seat assembly 304 of FIG. 13 shown in an upright position 1402. FIG. 14B is a side view of the window seat assembly 304 of FIG. 13 shown in a reclined position 1404. When the backrest 508 of the seat 504 moves between the upright position 1402 and the reclined position 1404, the lateral sleep apparatus 506 moves or translates (e.g., slides) in the first linear direction 614 relative to the fuselage wall 206 via the track 702 and the channel 1304. Thus, the headrest 514 and the cradle 516 translate (e.g., move horizontally) relative to the fuselage wall 206. While the first attachment assembly 608 (e.g., the track 702 and the slider 704) enables the lateral sleep apparatus 506 to move in the first linear direction 614, the second attachment assembly 610 enables the seat 504 to move in the second linear direction 616 and rotate in the rotational directions 618. The adjustor 612 enables adjustment (e.g., in the third linear direction 620) of the headrest 514 relative to the cradle 516 between the lowered position 1106 and the extended position 902.

Figure 15:
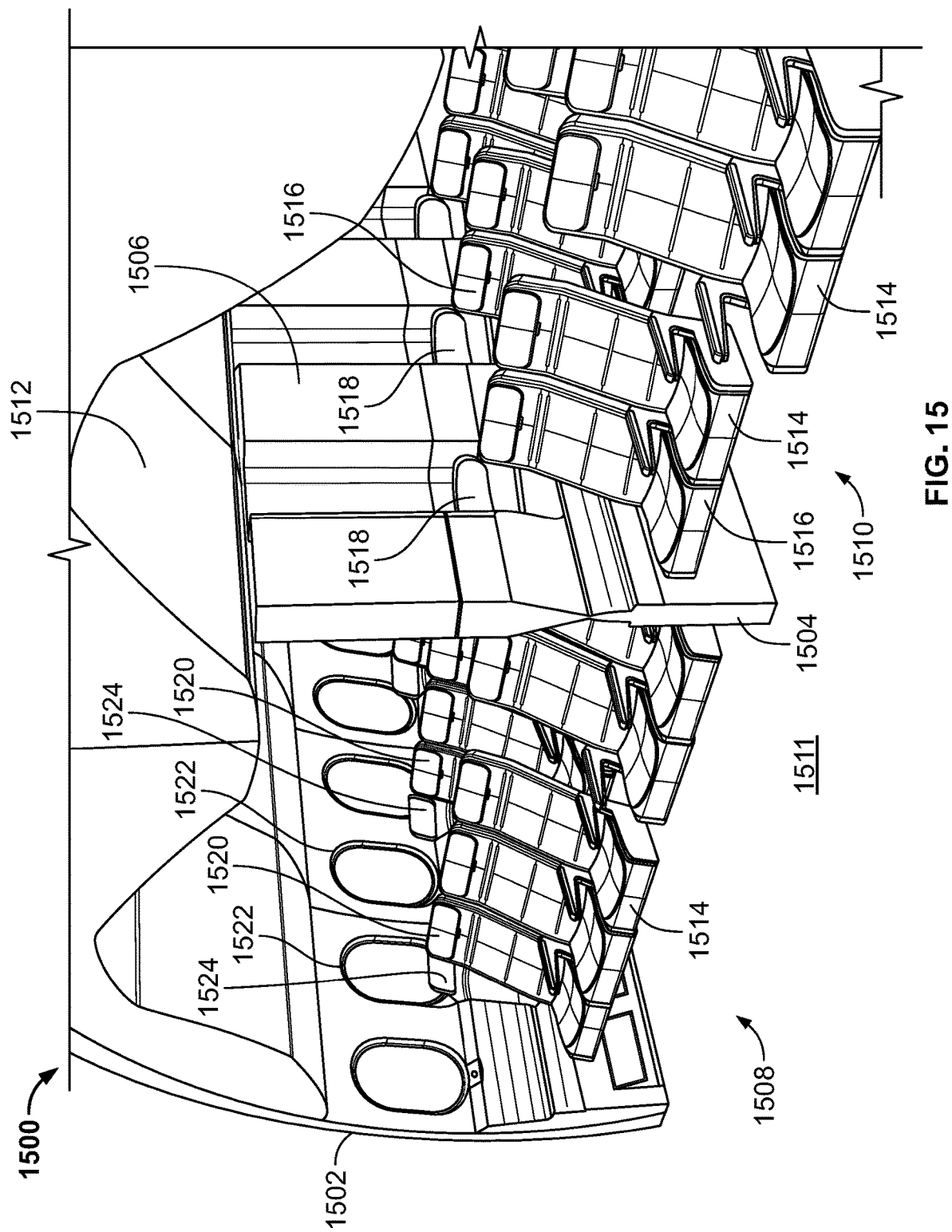
FIG. 15 is a perspective view of another example cabin disclosed herein.

FIG. 15 is a perspective view of another cabin 1500 of an aircraft disclosed herein. The cabin 1500 of FIG. 15 is formed by a fuselage wall 1502 and a divider 1504. The divider 1504 defines a wall 1506 that divides or splits the cabin 1500 into a first cabin section 1508 and a second cabin section 1510. In some examples, the divider 1504 isolates the first cabin section 1508 from the second cabin section 1510. For example, the divider 1504 extends between a floor 1511 of the cabin 1500 and a ceiling 1512 of the cabin 1500. In other words, the divider 1504 engages the floor 1511 and the ceiling 1512 when the divider 1504 is positioned in the cabin 1500. The cabin 1500 includes a plurality of seats 1514. Each seat 1516 adjacent the divider 1504 includes a first lateral sleep apparatus 1518. Additionally, each seat 1520 adjacent the fuselage wall 1502 or a window 1522 (e.g., a window seat) includes a second lateral sleep apparatus 1524. As described in greater detail below, the first lateral sleep apparatus 1518 is structurally different than (e.g., has a different geometric shape than) the second lateral sleep apparatus 1524. The first and second lateral sleep apparatus 1518, 1524 can be aircraft sleep systems and/or sleep systems in or for an aircraft (e.g., the aircraft 100 of FIG. 1).

Figure 16:
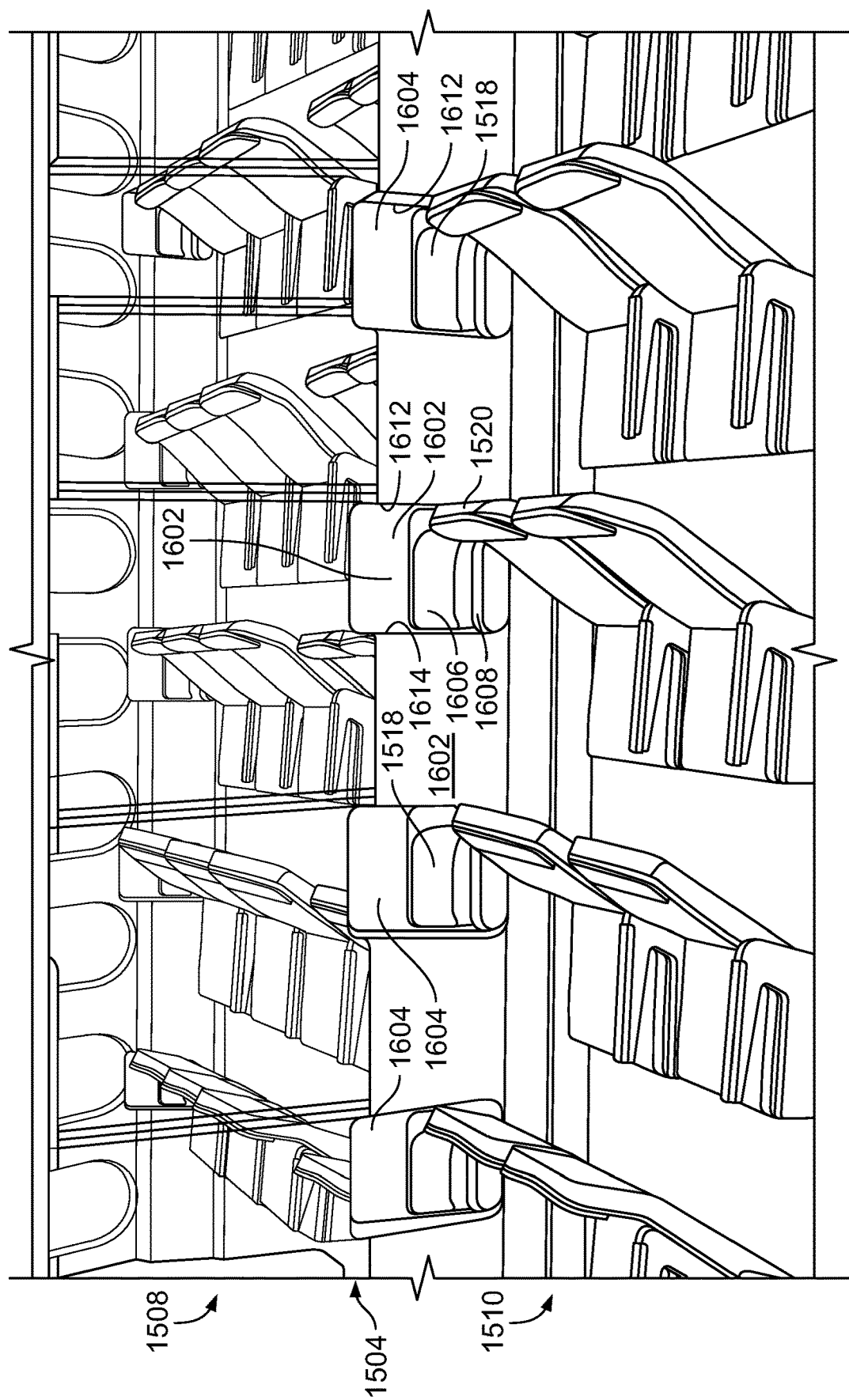
FIG. 16 is a side view of the example cabin of FIG. 15, showing an example first lateral sleep apparatus.

FIG. 16 is a side view of the cabin 1500 of FIG. 15 showing the first lateral sleep apparatus 1518. The divider 1504 of the illustrated example includes a plurality of panels 1602 defining a plurality of pockets 1604. The pockets 1604 are oriented or arranged in alternating pattern such that the pockets 1604 alternate orientation between the first cabin section 1508 and the second cabin section 1510. For example, a top view of each panel 1602 has a straight middle section (e.g., a center portion) and curved ends (e.g., a C-shaped cross section). Thus, when the panels 1602 are positioned or coupled together to form the divider 1504, the pockets 1604 (e.g., having the straight middle section and curved ends or C-shaped profiles) are positioned such that any two adjacent ones of the panels 1602 that are connected form a pattern having a first curved end, a second curved ends, a curved middle section, a straight portion between the first curved end and the curved middle section, and a straight portion between the curved middle section and the second curved end (i.e., an S-shaped pattern or profile). Each of the pockets 1604 of the illustrated example receives or supports a respective one of the first lateral sleep apparatus 1518. The first lateral sleep apparatus 1518 includes a headrest 1606 and a frame or cradle 1608. Specifically, the cradle 1608 is positioned adjacent (e.g., supported by or coupled to) the divider 1504. For example, the cradle 1608 is positioned in a pocket 1604 of the divider 1504. Specifically, the cradle 1608 and the headrest 1606 of the illustrated example are fixed relative to the seat 1516 and the divider 1504. Thus, the first lateral sleep apparatus 1518 of FIG. 16 does not translate (e.g., move horizontally) relative to the divider 1504 and/or the seat 1516. The cradle 1608 is contoured to a shape of the pocket 1604 such that the cradle 1608 mateably engages the pocket 1604. In some examples, the cradle 1608 and the pocket 1604 define a support ledge to support the headrest 1606. The headrest 1606 extends between a first inner wall 1612 and a second inner wall 1614 defining the pocket 1604. The cradle 1608 can be supported by or coupled to the pocket 1604 via a fastener (e.g., screws, rivets, etc.), a friction-fit connection, a snap-fit connection, adhesive, and/or any other fastener. Additionally, although the first lateral sleep apparatus 1518 engages the seat 1516, the first lateral sleep apparatus 1518 is not attached or fixed to the seat 1516 (e.g., via the second attachment assembly 610). In some examples, the first lateral sleep apparatus 1518 does not include the cradle 1608. In some such examples, the headrest 1606 is mounted directly to the panel 1602 of the divider 1504.

Figure 17:
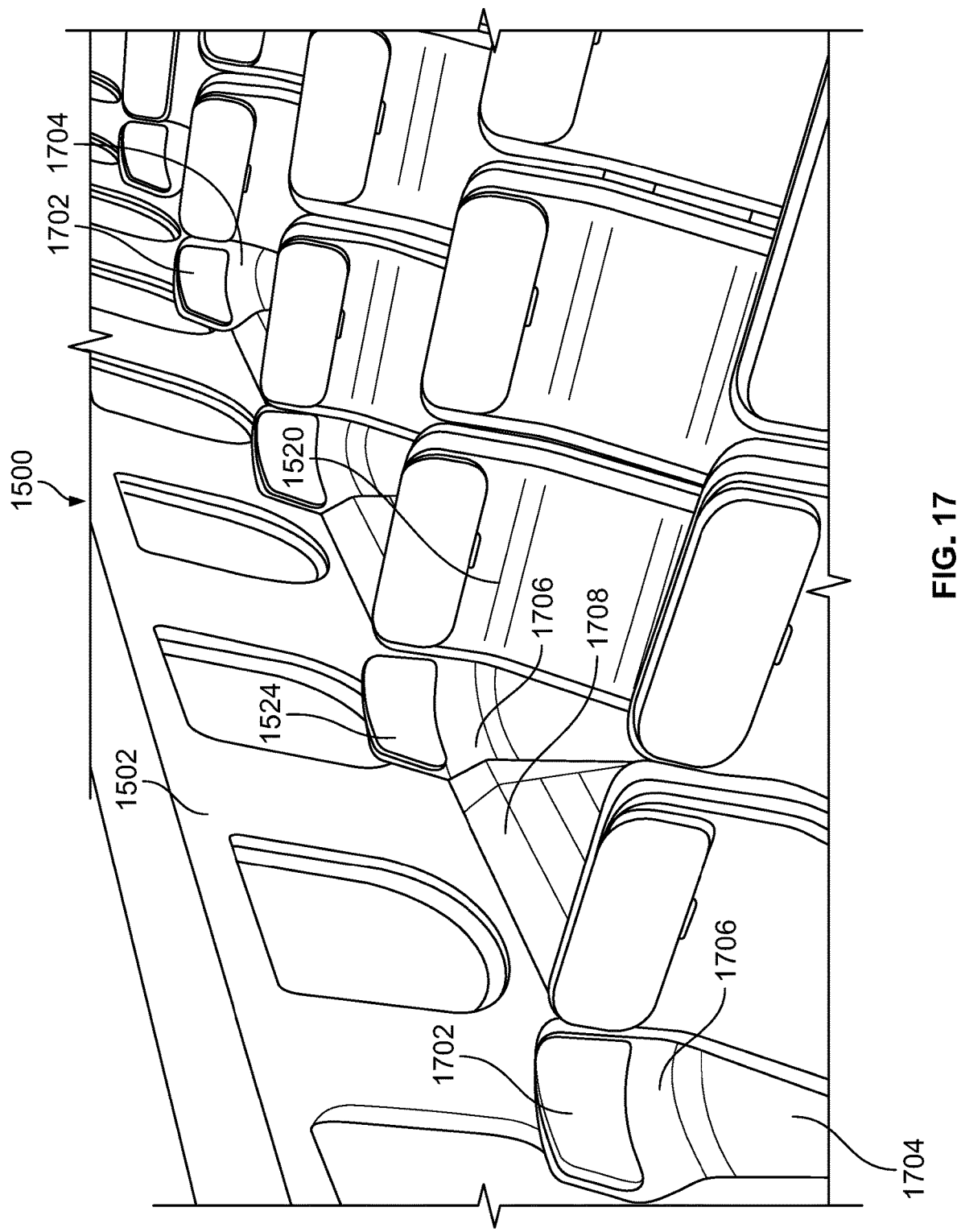
FIG. 17 is perspective view of the example cabin of FIG. 15, showing an example second lateral sleep apparatus.

FIG. 17 is a perspective view of the cabin 1500 of FIG. 15 showing the second lateral sleep apparatus 1524. The second lateral sleep apparatus 1524 includes a headrest 1702 and a cradle 1704. The cradle 1704 of the second lateral sleep apparatus 1524 is positioned adjacent (e.g., supported by or coupled to) the fuselage wall 1502 and the headrest 1702 is supported by or coupled to the cradle 1704. The cradle 1704 has a contoured shape defining a step 1706 that is supported or coupled to a support ledge 1708 of the fuselage wall 1502. The headrest 1702 of the second lateral sleep apparatus 1524 is fixed (e.g., vertically fixed) relative to the cradle 1704. For example, the headrest 1702 is coupled (e.g., fixed or attached) to the cradle 1704 via a fastener (e.g., a screw, adhesive, etc.). Although the cradle 1704 contacts or engages the seat 1520, the cradle 1704 of the second lateral sleep apparatus 1524 is not fixed or attached to the seat 1520 (e.g., via a seat attachment assembly). Thus, the second lateral sleep apparatus 1524 does not move laterally (e.g., horizontally) relative to the fuselage wall 1502.

The following paragraphs provide various examples of the examples disclosed herein. Additionally, several examples have been described throughout this specification. Any features from any example can be included with, a replacement for, or otherwise combined with other features from other examples. In other words, an example lateral sleep apparatus 202 disclosed herein is not mutually exclusive to another example lateral sleep apparatus 202 disclosed herein. For example, the cabin 200 of FIGS. 1-14B can include the divider 1504 of FIGS. 15-17. For example, the cabin 1500 of FIGS. 15-17 can include the divider 204 of FIGS. 1-14B. For example, the divider 1504 and/or the fuselage wall 1502 of FIGS. 15-17 can include the track 702 of FIGS. 1-14B. For example, the first lateral sleep apparatus 1518 and/or the second lateral sleep apparatus 1524 of FIGS. 15-17 can include the first attachment assembly 608 (e.g., a support structure attachment assembly), the second attachment assembly 610 (e.g., a seat attachment assembly), and/or the adjustor 612 of FIGS. 6A and 6B. For example, the lateral sleep apparatus 202 of FIGS. 1-14B can include the cradle 1704 of FIGS. 15-17.

Example 1 can be a sleep system for use with an aircraft having a seat having a first headrest. A lateral sleep apparatus is positioned adjacent the seat. The lateral sleep apparatus includes a second headrest and a cradle coupled to the second headrest. The cradle includes a first attachment assembly and a second attachment assembly. The first attachment assembly is to couple the cradle to a support structure of a cabin of an aircraft and the second attachment assembly is to couple the cradle to the seat.

Example 2 includes the sleep system of example 1, wherein the first attachment assembly is to enable movement of the second headrest between a first lateral position and a second lateral position different than the first lateral position when the seat moves between an upright position and a reclined position.

Example 3 includes the sleep system of any one of examples 1-2, wherein the first attachment assembly includes a track and a slider.

Example 4 includes the sleep system of any one of examples 1-3, wherein the track is to couple to the support structure and the slider is attached to the cradle, the track is to slidably receive the slider to enable the cradle to move relative to the support structure between a first end of the track and a second end of the track opposite the first end when the seat moves between the upright position and the reclined position.

Example 5 includes the sleep system of any one of examples 1-4, wherein the second attachment assembly is to maintain an elevation of the second headrest relative the first headrest when the seat moves between an upright position and a reclined position.

Example 6 includes the sleep system of any one of examples 1-5, wherein the second attachment assembly includes a track, a slider, and a pivot.

Example 7 includes the sleep system of any one of examples 1-6, wherein the cradle includes a seat mounting interface to couple to the seat, the seat mounting interface including a slot to receive the track.

Example 8 includes the sleep system of any one of examples 1-7, wherein the slot has a longitudinal axis that is at an angle relative to vertical.

Example 9 includes the sleep system of any one of examples 1-8, wherein the track is to slidably receive the slider, the slider to move between a first end of the track and a second end of the track opposite the first end when the seat moves between the upright position and the reclined position.

Example 10 includes the sleep system of any one of examples 1-9, wherein the pivot is coupled to the slider, the pivot is to rotate relative to the slider between a first rotational position and a second rotational position when the seat moves between the upright position and the reclined position.

Example 11 includes the sleep system of any one of examples 1-10, wherein the support structure is at least one of a fuselage wall or a divider.

Example 12 includes the sleep system of any one of examples 1-11, wherein the cradle includes a first portion offset relative to a second portion and a transition to couple the first portion and the second portion, the transition to engage a support ledge of the support structure.

Example 13 includes the sleep system of any one of examples 1-12, wherein the lateral sleep apparatus includes and adjustor to enable movement of the headrest relative to the cradle between a lowered position and an extended position.

Example 14 can be a sleep system having a divider having a plurality of panels, each panel defining a pocket. A lateral sleep apparatus positioned adjacent a seat. The lateral sleep apparatus to be positioned in the pocket of the panel.

Example 15 includes the sleep system of example 14, wherein the pocket defines a support ledge to support the lateral sleep apparatus.

Example 16 includes the sleep system of any one of examples 14-15, wherein the lateral sleep apparatus includes a headrest and a cradle, the cradle to couple to the support ledge of the divider.

Example 17 includes the sleep system of any one of examples 14-16, wherein a first portion of a first panel and a second portion of a second panel adjacent the first panel define the pocket.

Example 18 includes the sleep system of any one of examples 14-17, wherein the first panel is positioned between the second panel and a third panel, and wherein the support ledge includes a track positioned a first partition formed between the first panel and the second panel and a second partition formed between the first panel and the third panel.

Example 19 includes the sleep system of any one of examples 14-18, wherein the divider is to divide a cabin in a first section defining a first plurality of seats and a second section defining a second plurality of seats, wherein a first pocket of a first panel is to orient toward the first section of the cabin and a second pocket of a second panel adjacent the first panel is to orient toward the second section opposite the first section.

Example 20 can be a sleep system for use with an aircraft having a modular divider positionable in a cabin of the aircraft. The divider is to divide the cabin into a first section and a second section. The divider defines pockets to be oriented toward at least one of the first section or the second section. A lateral sleep apparatus is positioned adjacent a seat located adjacent a window of the aircraft or the divider. The lateral sleep apparatus is to couple to a side surface of the seat and a support ledge formed by a fuselage wall or the divider. The lateral sleep apparatus includes a cradle and a headrest. A first attachment assembly is to couple the cradle to the support ledge. The first attachment assembly includes a first track and a first slider. The first track to couple to a channel of the support ledge and the slider to couple to a rear surface of the cradle such that the first slider engages the first track when the cradle is supported by the support ledge. A second attachment assembly is to couple the cradle to the seat. The second attachment assembly includes a second track, a second slider and a pivot. The second track is to couple to a second channel formed in a seat mounting interface of the cradle. The slider is to couple to the second track and the pivot is to couple to the slider. The pivot is to attach to a side surface of the seat, the first attachment assembly and the second attachment assembly to enable the lateral sleep apparatus to translate relative to the support ledge when the seat moves between an upright position and a reclined position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A lateral sleep system for use with an aircraft, the lateral sleep system comprising:
   a divider configured to be located between a first seat and a second seat of the aircraft, the divider including a first panel oriented toward the first seat and a second panel oriented toward the second seat, the first panel defining a first support ledge, the second panel defining a second support ledge;
   a first lateral sleep apparatus positioned on a first side of the divider adjacent the first seat, the first lateral sleep apparatus including a first headrest and a first cradle, the first cradle configured to support the first headrest, the first cradle including a first panel mounting interface configured to couple the first headrest to the first support ledge; and
   a second lateral sleep apparatus positioned on a second side of the divider opposite the first side and adjacent the second seat, the second lateral sleep apparatus including a second headrest and a second cradle, the second cradle configured to support the second headrest, the second cradle including a second panel mounting interface configured to couple the second headrest to the second support ledge;
   wherein the first panel mounting interface includes a first track coupled to the first support ledge and a first slider coupled to the first cradle, the first track configured to slidably receive the first slider between a first end of the first track and a second end of the first track opposite the first end of the first track.

2. The lateral sleep system of claim 1, wherein the first lateral sleep apparatus includes a cushion.

3. The lateral sleep system of claim 1, wherein the first track is positioned within a channel formed in the first support ledge.

4. The lateral sleep system of claim 1, wherein the first slider is coupled to a rear surface of the first cradle such that the first slider engages the first track when the first cradle is supported by the first support ledge.

5. The lateral sleep system of claim 1, wherein the first cradle includes a seat mounting interface configured to couple the first headrest to the first seat, the seat mounting interface configured to enable the first cradle to move relative to the first track in response to the first seat moving between an upright position and a reclined position.

6. The lateral sleep system of claim 5, wherein the seat mounting interface includes a second track and a second slider, the second track configured to slidably receive the second slider between a first end of the second track and a second end of the second track opposite the first end of the second track, the second slider configured to move relative to the second track when the first seat moves between the upright position and the reclined position.

7. The lateral sleep system of claim 6, wherein the seat mounting interface includes a pivot coupled to the second slider, the pivot configured to rotate relative to the second slider between a first rotational position and a second rotational position when the first seat moves between the upright position and the reclined position.

8. The lateral sleep system of claim 7, wherein the pivot is configured to be coupled to a side surface of the first seat.

9. The lateral sleep system of claim 6, wherein the second track is positioned within a slot formed in the first cradle.

10. The lateral sleep system of claim 9, wherein the slot has a longitudinal axis that is at an angle relative to vertical.

11. The lateral sleep system of claim 1, wherein the first panel includes a first panel portion, a second panel portion, and a transition panel portion, the first panel portion offset relative to the second panel portion, the transition panel portion extending between the first panel portion and the second panel portion to form a stepped profile that defines the first support ledge.

12. The aircraft lateral sleep system of claim 1, wherein the second lateral sleep apparatus is offset from the first lateral sleep apparatus in a direction extending along a longitudinal axis of a fuselage cabin of the aircraft.

13. The lateral sleep system of claim 12, wherein the first support ledge of the first panel is defined by a first pocket and the second support ledge of the second panel is defined by a second pocket, the first cradle positioned at least partially in the first pocket, the second cradle positioned at least partially in the second pocket.

14. The lateral sleep system of claim 13, wherein the second pocket is offset from the first pocket in a direction extending along a longitudinal axis of a fuselage cabin of the aircraft.

15. The lateral sleep system of claim 1, wherein the first headrest of the first lateral sleep apparatus is a lateral headrest oriented at an angle relative to a rear headrest of the first seat, the lateral headrest and the rear headrest collectively forming an L-shaped headrest extending from the first seat onto the first cradle.

16. The lateral sleep system of claim 1, wherein an end of the first headrest is to be positioned adjacent an end of a rear headrest of the aircraft seat.

17. The lateral sleep system of claim 11, wherein the transition panel portion has a tapered or angled profile.

18. The lateral sleep system of claim 17, wherein the transition panel portion has an angle relative to vertical that is between 30 degrees and 60 degrees.

19. The lateral sleep system of claim 1, wherein the first lateral sleep apparatus wraps from a side surface of the first seat toward a front end of the first seat such that a rear headrest of the first seat and the first lateral sleep apparatus provide a curved headrest.

20. The lateral sleep system of claim 1, wherein the first lateral sleep apparatus wraps from a side surface of the first seat toward a front end of the first seat such that a rear headrest of the first seat and the first lateral sleep apparatus provide a curved headrest that reduces discontinuity between a transition from the rear headrest of the first seat and the first lateral sleep apparatus.

\* \* \* \* \*

UNITED STATES PATENT AND TRADEMARK OFFICE
CERTIFICATE OF CORRECTION

PATENT NO. : 11,952,122 B2
APPLICATION NO. : 17/887131
DATED : April 9, 2024
INVENTOR(S) : Aung et al.

It is certified that error appears in the above-identified patent and that said Letters Patent is hereby corrected as shown below:

In the Claims

In Column 18, Claim 12, Line 19, delete "aircraft".

Signed and Sealed this
Fourth Day of June, 2024

Katherine Kelly Vidal
*Director of the United States Patent and Trademark Office*